US011861883B2

(12) United States Patent
Takahashi

(10) Patent No.: US 11,861,883 B2
(45) Date of Patent: Jan. 2, 2024

(54) INFORMATION PROCESSING APPARATUS AND INFORMATION PROCESSING METHOD

(71) Applicant: SONY GROUP CORPORATION, Tokyo (JP)

(72) Inventor: Ryo Takahashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 97 days.

(21) Appl. No.: 17/609,476

(22) PCT Filed: Mar. 25, 2020

(86) PCT No.: PCT/JP2020/013350
§ 371 (c)(1),
(2) Date: Nov. 8, 2021

(87) PCT Pub. No.: WO2020/230459
PCT Pub. Date: Nov. 19, 2020

(65) Prior Publication Data
US 2022/0230423 A1 Jul. 21, 2022

(30) Foreign Application Priority Data

May 16, 2019 (JP) .................. 2019-092654

(51) Int. Cl.
*G06V 20/69* (2022.01)
*G06V 10/778* (2022.01)
(Continued)

(52) U.S. Cl.
CPC ........ *G06V 10/7788* (2022.01); *G06V 10/762* (2022.01); *G06V 10/774* (2022.01)

(58) Field of Classification Search
CPC ........ G06F 21/32; G06F 18/256; G06F 18/22; G06V 40/20; G06V 20/695; G06V 20/69;
(Continued)

(56) References Cited

U.S. PATENT DOCUMENTS 5,483,066 A * 1/1996 Sadjadi ................. G01J 5/58
250/330
9,547,760 B2 * 1/2017 Kang .................. G06F 21/32
(Continued)

FOREIGN PATENT DOCUMENTS

CN 110023952 A 7/2019
JP 2014-142871 A 8/2014
(Continued)

OTHER PUBLICATIONS

International Search Report and Written Opinion of PCT Application No. PCT/JP2020/013350, dated Jun. 16, 2020, 09 pages of ISRWO.

*Primary Examiner* — Yosef Kassa
(74) *Attorney, Agent, or Firm* — CHIP LAW GROUP

(57) ABSTRACT

Provided is an information processing apparatus including: an output control unit that controls display of information regarding an erroneous recognition target different from a predetermined recognition target, the erroneous recognition target being specified as having a possibility of erroneous recognition on the basis of a result of recognition processing on at least one piece of specifying data by a recognizer generated for recognizing the predetermined recognition target and a result of clustering processing on a target recognized by the recognition processing. The recognizer is generated by learning based on at least one piece of learning data. The at least one piece of learning data includes the predetermined recognition target and is data in substantially the same context. The specifying data is data in substantially
(Continued)

the same context as the context of the at least one piece of learning data.

19 Claims, 17 Drawing Sheets

(51) Int. Cl.
*G06V 10/762* (2022.01)
*G06V 10/774* (2022.01)

(58) Field of Classification Search
CPC ......... G06L 17/10; G06T 7/0012; G06T 7/40; G06B 21/365; G06N 20/00
See application file for complete search history.

(56) References Cited

U.S. PATENT DOCUMENTS

| | | | |
|---|---|---|---|
| 9,684,958 B2 * | 6/2017 | Usuba | G06T 7/0012 |
| 10,397,400 B2 * | 8/2019 | Gupta | G10L 17/00 |
| 10,413,011 B2 * | 9/2019 | Jordan | H04R 1/028 |
| 10,446,068 B2 * | 10/2019 | Butler | H05K 7/20954 |
| 10,657,281 B2 * | 5/2020 | Takimoto | G06F 18/22 |
| 10,679,060 B2 * | 6/2020 | Mietke | G06N 20/00 |
| 10,980,359 B2 * | 4/2021 | Billings | G06Q 10/20 |
| 2018/0246846 A1 | 8/2018 | Takimoto | |
| 2019/0370586 A1 | 12/2019 | Otsuki | |

FOREIGN PATENT DOCUMENTS

| | | |
|---|---|---|
| JP | 2017-107313 A | 6/2017 |
| JP | 2018-096834 A | 6/2018 |
| JP | 2018-142097 A | 9/2018 |
| WO | 2018/110575 A1 | 6/2018 |

* cited by examiner

FIG.6

| | IMAGE | RELIABILITY | IoU | REMARK |
|---|---|---|---|---|
| SC3 | | 98% | 92% | · DATE AND TIME: 2019/07/25<br>· PLACE: JAPAN/XXX PREFECTURE/ YYY FARM |
| | | 95% | 73% | |
| | | | | |
| | | 96% | 93% | · DATE AND TIME: 2019/07/25<br>· PLACE: JAPAN/XXX PREFECTURE/ YYY FARM |
| | | 70% | 42% | |
| | | 60% | 0% | |
| | ... | ... | ... | ... |

FIG.15

| MOVING IMAGE | INPUT DATA/RECOGNITION RESULT | AVERAGE PROBABILITY | REMARK |
|---|---|---|---|
| | X AXIS / Y AXIS / Z AXIS | 85% | · DATE AND TIME: 2019/06/15<br>EXPECTED RECOGNITION Ctrl+T<br>UNEXPECTED RECOGNITION Ctrl+F |
| ... | ... | ... | ... |

| STATUS | PIPELINE | RECOGNIZER/VERSION | SPECIFYING DATA SET DB/VERSION | |
|---|---|---|---|---|
| RUNNING | #6501 | TOMATO DETECTOR<br>82b8d9ea | Plantea Image Database<br>ver.2015 | |
| RUNNING | #6500 | MUSIC IDENTIFIER<br>40ac1623 | World Pop Music Streaming Database<br>release/2019/w12 | |
| ✓ ACCURACY MAINTENANCE | #6499 | GESTURE DETECTOR<br>1ebb252a | IMU DATA OF SMART BAND<br>add_2019_models.data | 00:30:98<br>10 minutes ago |
| ✗ ACCURACY DECREASE | #6488 | CLOTHING SEMANTIC SEGMENTATION<br>d00699d9 | JAPANESE WOMEN'S FASHION<br>2019/Summer/rev~1 | 12:11:21<br>1 hour ago |
| ✓ ACCURACY MAINTENANCE | #6487 | CLOTHING SEMANTIC SEGMENTATION<br>d00699d9 | JAPANESE WOMEN'S FASHION<br>2019/Summer/rev~1 | 12:12:65<br>1 day ago |
| ... | ... | ... | ... | ... |

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2020/013350 filed on Mar. 25, 2020, which claims priority benefit of Japanese Patent Application No. JP 2019-092654 filed in the Japan Patent Office on May 16, 2019. Each of the above-referenced applications is hereby incorporated herein by reference in its entirety.

FIELD

The present disclosure relates to an information processing apparatus, an information processing method, and a program.

BACKGROUND

In recent years, a device that performs processing of recognizing a predetermined target in an image, a voice, a sentence, or the like by a recognizer generated using technology related to supervised machine learning has become widespread. Incidentally, in recognizing the predetermined target, more learning data sets are required in order to improve recognition accuracy. However, in a situation where there is a limit to a development period, there is a limit to an amount of learning data sets that can be constructed.

In response to the above situation, for example, Patent Literature 1 discloses technology for reducing the number of man-hours for constructing a learning data set by semi-automating the labeling work.

CITATION LIST

Patent Literature

Patent Literature 1: JP 2018-96834 A

SUMMARY

Technical Problem

However, in the technology described in Patent Literature 1, it is not possible to confirm whether or not the amount and diversity of the learning data set are sufficient, recognition accuracy of the recognizer is evaluated by an evaluation device, and in a case where it is found that the amount and diversity of the learning data set are insufficient, rework of a process occurs at the stage of constructing the learning data set.

Solution to Problem

According to the present disclosure, an information processing apparatus is provided that includes: an output control unit that controls display of information regarding an erroneous recognition target different from a predetermined recognition target, the erroneous recognition target being specified as having a possibility of erroneous recognition on the basis of a result of recognition processing on at least one piece of specifying data by a recognizer generated for recognizing the predetermined recognition target and a result of clustering processing on a target recognized by the recognition processing, wherein the recognizer is generated by learning based on at least one piece of learning data, the at least one piece of learning data includes the predetermined recognition target and is data in substantially the same context, and the specifying data is data in substantially the same context as the context of the at least one piece of learning data.

Moreover, according to the present disclosure, an information processing method is provided that includes: causing a processor to controls display of information regarding an erroneous recognition target different from a predetermined recognition target, the erroneous recognition target being specified as having a possibility of erroneous recognition on the basis of a result of recognition processing on at least one piece of specifying data by a recognizer generated for recognizing the predetermined recognition target and a result of clustering processing on a target recognized by the recognition processing, wherein the recognizer is generated by learning based on at least one piece of learning data, the at least one piece of learning data includes the predetermined recognition target and is data in substantially the same context, and the specifying data is data in substantially the same context as the context of the at least one piece of learning data.

Moreover, according to the present disclosure, a program is provided that causes a computer to function as an information processing apparatus, wherein the information processing apparatus includes an output control unit that controls display of information regarding an erroneous recognition target different from a predetermined recognition target, the erroneous recognition target being specified as having a possibility of erroneous recognition on the basis of a result of recognition processing on at least one piece of specifying data by a recognizer generated for recognizing the predetermined recognition target and a result of clustering processing on a target recognized by the recognition processing, the recognizer is generated by learning based on at least one piece of learning data, the at least one piece of learning data includes the predetermined recognition target and is data in substantially the same context, and the specifying data is data in substantially the same context as the context of the at least one piece of learning data.

BRIEF DESCRIPTION OF DRAWINGS

FIG. 6 is a diagram illustrating an example of a display screen of an evaluation result of a recognizer by a recognizer development unit 220 according to the embodiment.

FIG. 15 is a diagram illustrating an example of screen display related to an erroneous recognition target in a case where learning data is motion data in a modification of the embodiment of the present disclosure.

FIG. 16 is a diagram illustrating an example of screen display of information regarding updating of a specifying data set DB 471 by an output control unit 440 in a modification of the embodiment of the present disclosure.

DESCRIPTION OF EMBODIMENTS

Figure 1:
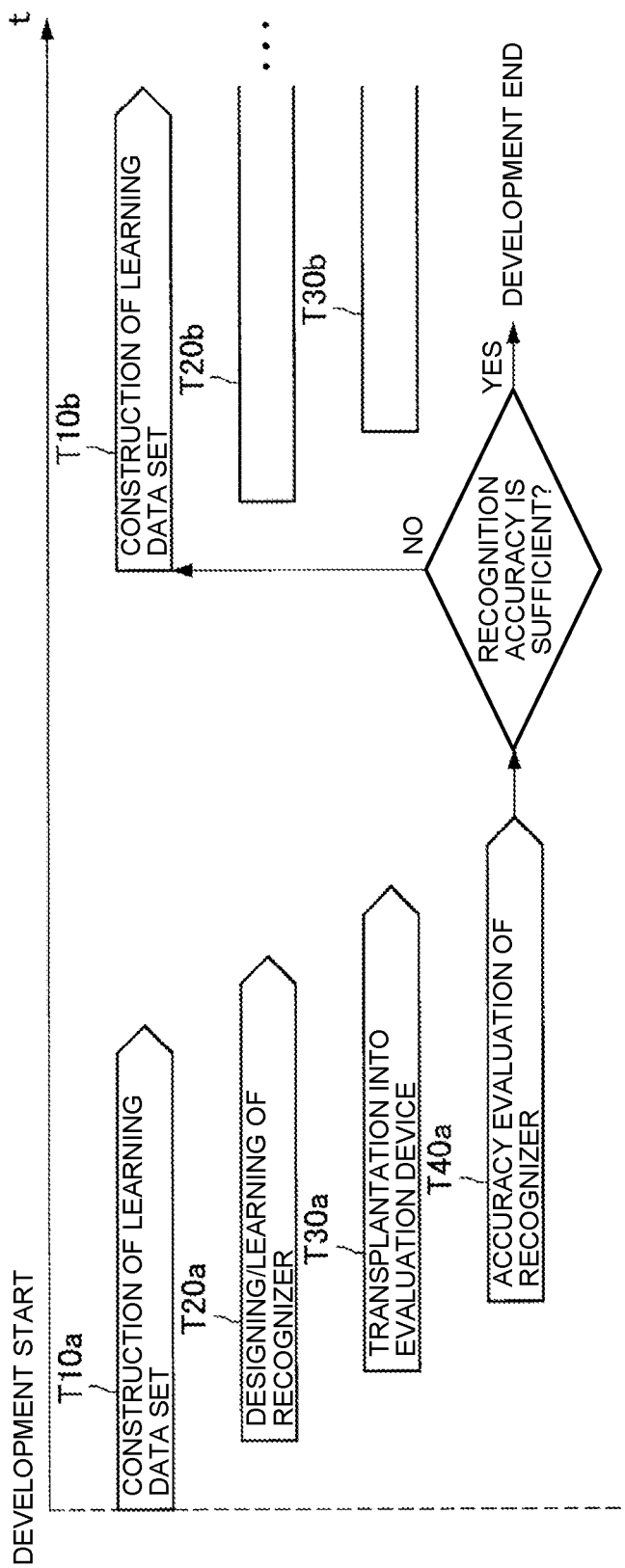
FIG. 1 is a diagram illustrating an outline of a development cycle in a case of developing a recognizer using supervised machine learning technology according to the present disclosure.

Hereinafter, preferred embodiments of the present disclosure will be described in detail with reference to the accompanying drawings. Note that, in the present specification and the drawings, redundant description of components having substantially the same functional configuration is omitted by assigning the same reference numerals.

Note that the description will be given in the following order.
1. Background
2. Embodiment
   2.1. Overall configuration example of system 1
   2.2. Functional configuration example of recognizer development device 20
   2.3. Functional configuration example of information processing server 40
   2.4. Operation example
      2.4.1. Operation example 1
      2.4.2. Operation example 2
      2.4.3. Operation example 3
   2.5. Modification
      2.5.1. First modification
      2.5.2. Second modification
3. Hardware configuration example
4. Conclusion 1. Background First, a background of the present disclosure will be described. In recent years, in a field such as Internet of Things (IoT), a device that performs processing of recognizing a predetermined target in an image, a voice, a sentence, or the like by a recognizer generated using technology related to so-called supervised machine learning such as deep learning has become widespread.

In a case of developing the recognizer using the supervised machine learning technology such as the deep learning, generally, it is common to repeat a development cycle including constructing a learning data set, designing and learning the recognizer, transplanting the recognizer to an evaluation device, and evaluating the accuracy of the recognizer.

Here, an outline of a development cycle in a case where the recognizer is developed using the supervised machine learning technology will be described with reference to FIG. 1. As described above, in general, when the recognizer is developed using the supervised machine learning technology, work is performed in the order of the construction T10 of the learning data set, the designing and learning T20 of the recognizer, the transplantation T30 of the recognizer to the evaluation device, and the accuracy evaluation T40 of the recognizer.

The construction T10 of the learning data set is work of collecting learning data including a recognition target to be recognized by the recognizer and labeling the recognition target included in the learning data. Here, the recognition target exists in the learning data. For example, in a case where the learning data is image data, the recognition target is a predetermined region in the image data, and the predetermined region is labeled. Note that, hereinafter, the learning data in which the recognition target is labeled is also referred to as the learning data set.

The designing and learning T20 of the recognizer is work of designing and learning the recognizer so as to recognize the recognition target included in the learning data, on the basis of the learning data set constructed by the construction T10 of the learning data set. Further, the transplantation T30 of the recognizer to the evaluation device is work of transplanting the recognizer to the evaluation device that performs the accuracy evaluation of the recognizer. Here, the evaluation device is, for example, a device in which a developed recognizer is actually used. Further, the accuracy evaluation T40 of the recognizer is work of evaluating the recognition accuracy of the recognizer in the evaluation device.

Here, in order to further improve the recognition accuracy of the recognizer, improvement of diversity of the learning data can be required. If the diversity of the learning data is not sufficient, the recognizer is not sufficiently generalized, and for example, a target that is similar to, but different from the recognition target, other than the recognition target to be recognized, may be recognized as the recognition target (false positive).

Here, the erroneous recognition means that the recognizer recognizes a target included in data different from a predetermined recognition target included in the learning data to be recognized as the recognition target (false positive). As an example, it is called false positive that a recognizer learned to recognize a "tomato" portion in image data recognizes a "paprika" portion different from "tomato" in certain image data as "tomato".

In a case where a recognizer is generated by learning using only image data in which "tomato" is captured in a home garden as learning data, a situation in which the recognizer not only recognizes "tomato" but also recognizes "paprika" or "apple" that is substantially the same in color as "tomato" and slightly different in shape from "tomato" as "tomato" can occur. The above situation can occur due to, for example, that the recognizer performs recognition in response to only the color of "tomato". In a case where it is desired to develop a recognizer that recognizes "tomato" without recognizing "paprika" or "apple", it is necessary to generate the recognizer by learning using image data in which "paprika" or "apple" is captured.

That is, in order to improve diversity of learning data, more learning data is generally required. However, since the work of labeling a recognition target included in the learning data is performed by a user's hand, a work time increases as an amount of learning data increases, and the burden on a user increases. Therefore, there may be a limit to improvement of the diversity of the learning data. In addition, there may be a situation in which there is a limit to learning data that can be prepared in a predetermined context.

In response to the above situation, for example, Patent Literature 1 described above discloses technology for reducing the number of man-hours for constructing a learning data set by semi-automating the labeling work. However, Patent Literature 1 does not consider checking whether or not the amount and diversity of learning data included in the learning data set are sufficient.

It is necessary to perform the transplantation T30 of the recognizer to the evaluation device and the accuracy evaluation T40 of the recognizer each time the construction T10 of the learning data set and the designing and learning T20 of the recognizer are completed. Then, as a result of the accuracy evaluation, in a case where the recognition accuracy of the recognizer is not sufficient, it is necessary to repeatedly perform the above process, so that a development period may be increased.

The technical ideas according to the present disclosure have been conceived in view of the above points, and it is possible to prevent rework in the development process of the recognizer and decrease the development period by specifying a target that can be erroneously recognized using data of a context substantially the same as the context of the learning data and prompting the user to reconsider the diversity of the learning data. Note that, hereinafter, an example in which the recognizer recognizes an object of a recognition target captured in a predetermined region in image data will be described.

2. Embodiment

2.1. Overall Configuration Example of System 1

Figure 2:
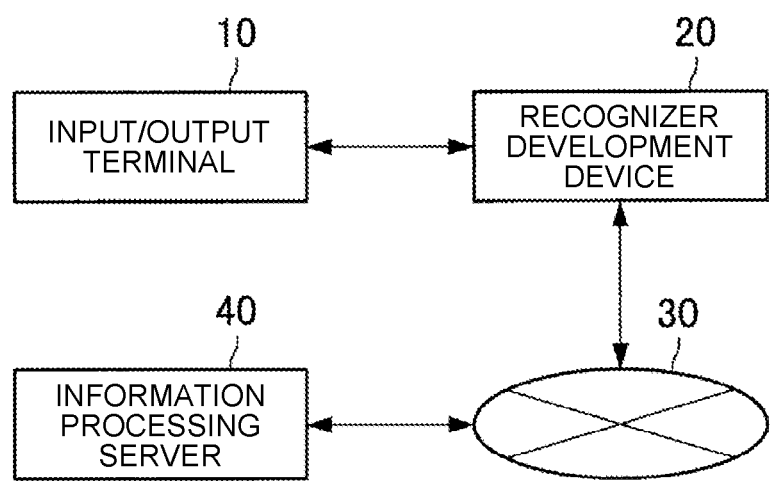
FIG. 2 is a diagram illustrating an example of an overall configuration of a system 1 according to the present embodiment.

Next, an example of an overall configuration of the system 1 according to the present embodiment will be described with reference to FIG. 2. As illustrated in FIG. 2, the system 1 includes an input/output terminal 10, a recognizer development device 20, a network 30, and an information processing server 40.

(Input/Output Terminal 10)

The input/output terminal 10 receives input from the user. Further, the input/output terminal 10 outputs information regarding processing executed by the recognizer development device 20 or the information processing server 40 to the user. The input/output terminal 10 may be, for example, a mobile terminal such as a personal computer (PC), a smartphone, or a tablet terminal.

Alternatively, the input/output terminal 10 may be a liquid crystal display (LCD) device, an organic light emitting diode (OLED) device, or a projector.

(Recognizer Development Device 20)

The recognizer development device 20 constructs a learning data set on the basis of the learning data transmitted from the input/output terminal 10. Specifically, the recognizer development device 20 labels a recognition target included in the learning data on the basis of the input from the user, and generates a learning data set. Further, the recognizer development device 20 performs designing and learning of the recognizer based on the learning data. A detailed functional configuration of the recognizer development device 20 will be described later.

(Network 30)

The network 30 has a function of connecting the recognizer development device 20 and the information processing server 40. The network 30 may include a public line network such as the Internet, a telephone line network, or a satellite communication network, various local area networks (LANs) including Ethernet (registered trademark), a wide area network (WAN), and the like. Further, the network 30 may include a dedicated line network such as an Internet protocol-virtual private network (IP-VPN). Furthermore, the network 30 may include a wireless communication network such as Wi-Fi (registered trademark) or Bluetooth (registered trademark).

(Information Processing Server 40)

The information processing server 40 is an example of an information processing apparatus that specifies an erroneous recognition target that is likely to be erroneously recognized by a recognizer generated in order to recognize a predetermined recognition target by the recognizer development device 20, and controls output of information regarding the specified erroneous recognition target. Here, the erroneous recognition means that the recognizer recognizes a target, which is different from the predetermined recognition target and included in specifying data, as the recognition target (false positive). Note that the information processing server 40 receives the recognizer and the learning data set from the recognizer development device 20 via the network 30. A detailed functional configuration of the information processing server 40 will be described later. Note that the information processing server 40 may be a server on a cloud available in a cloud service.

The configuration example of the system 1 according to the present embodiment has been described above. Note that the above configuration described using FIG. 2 is merely an example, and the configuration of the system 1 according to the present embodiment is not limited to such an example. The configuration of the system 1 according to the present embodiment can be flexibly modified according to specifications and operations.

2.2. Functional Configuration Example of Recognizer Development Device 20

Figure 3:
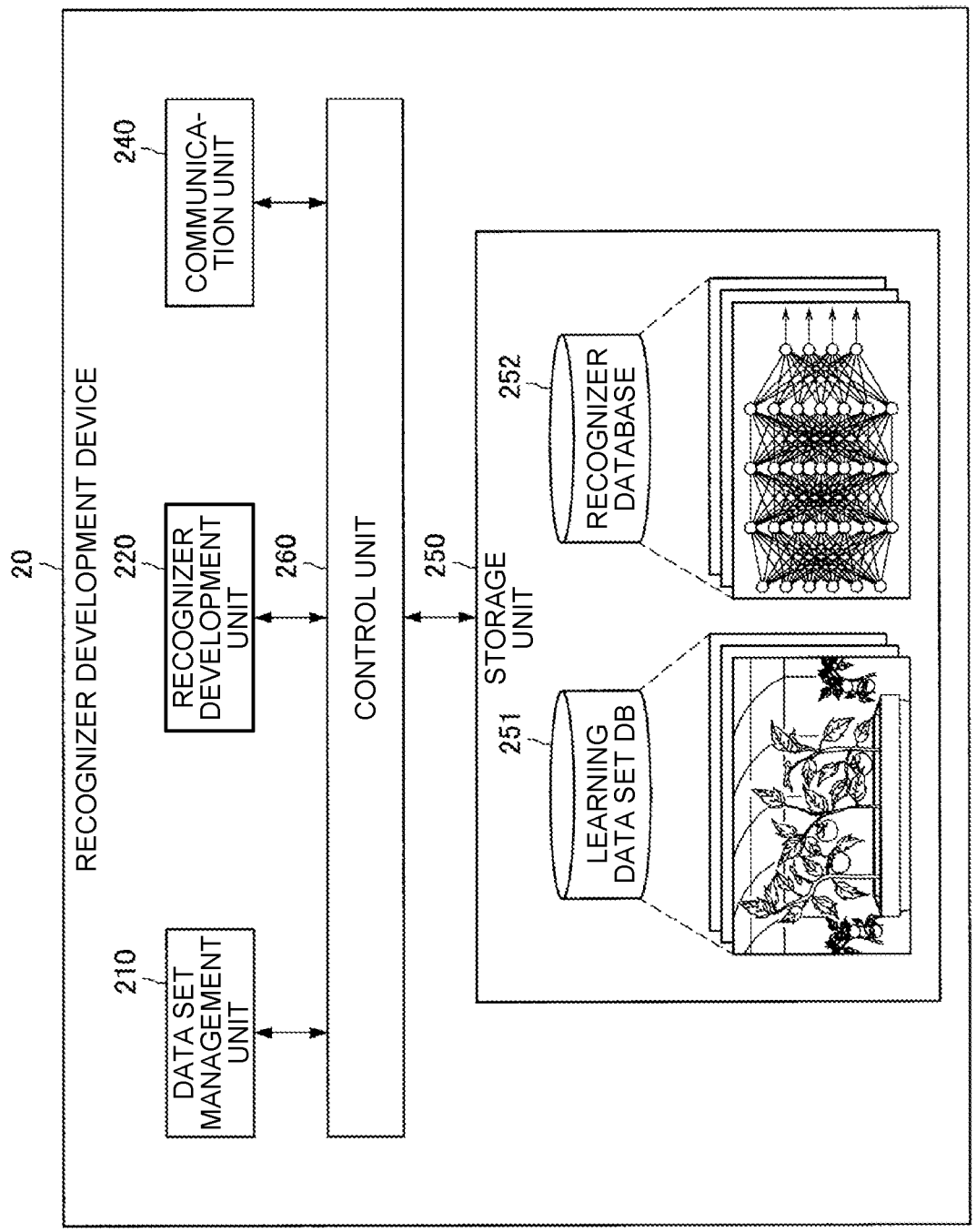
FIG. 3 is a diagram illustrating an example of a functional configuration of a recognizer development device 20 according to the embodiment.

Next, an example of a functional configuration of the recognizer development device 20 according to the present embodiment will be described with reference to FIG. 3. The recognizer development device 20 includes a data set management unit 210, a recognizer development unit 220, a communication unit 240, a storage unit 250, and a control unit 260. Note that the storage unit 250 includes a learning data set DB 251 and a recognizer database 252. The learning data set DB 251 is a collection of learning data sets, and the recognizer database 252 is a collection of recognizers that are being developed or have been developed.

(Data Set Management Unit 210)

The data set management unit 210 executes construction of a learning data set stored in the storage unit 250 to be described later, on the basis of input from the user via the input/output terminal 10. Specifically, the data set management unit 210 displays a screen for labeling work on the input/output terminal 10 at the time of labeling work for each learning data, and labels the learning data on the basis of input from the user to the screen.

Figure 4:
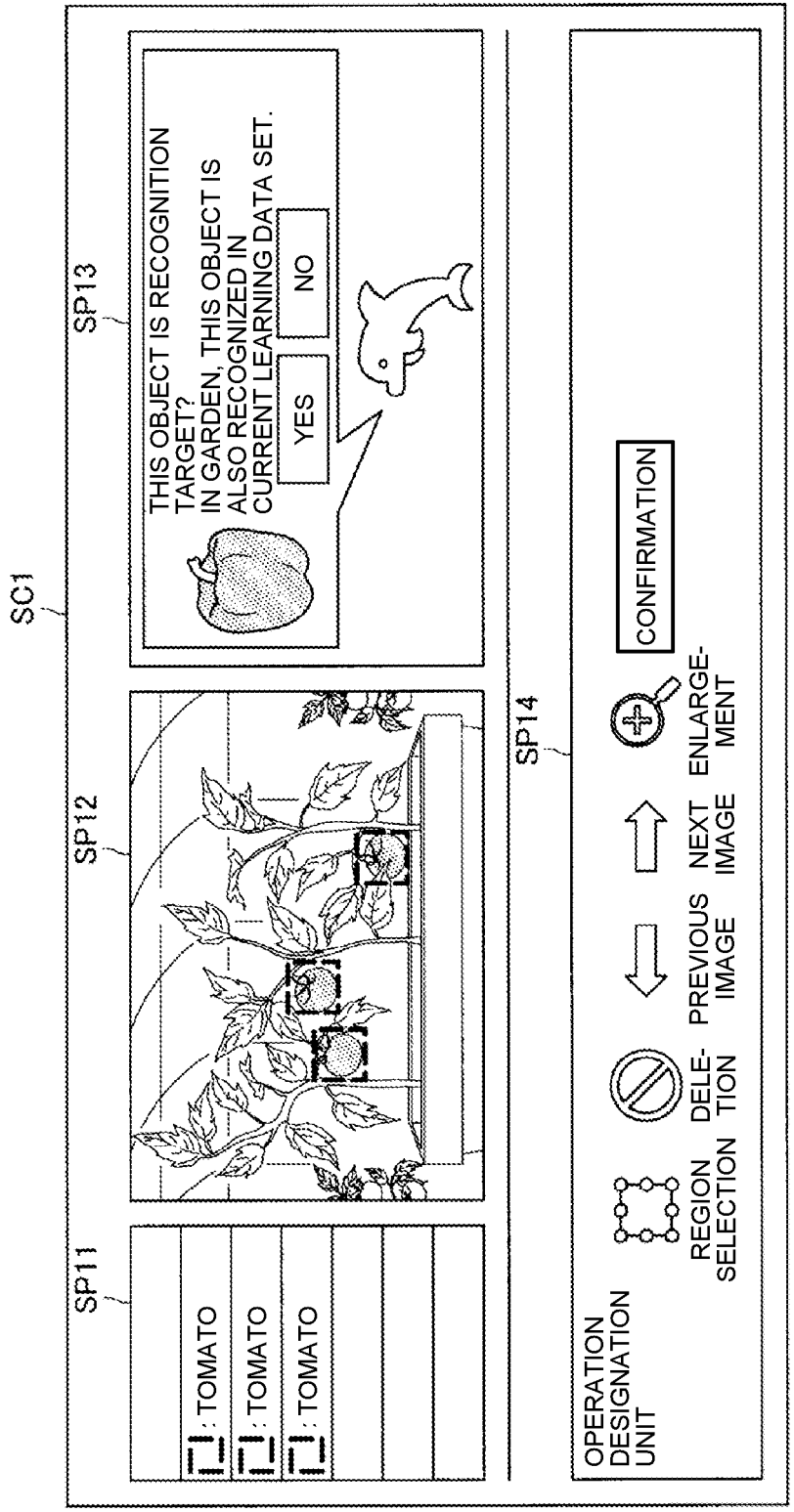
FIG. 4 is a diagram illustrating an example of screen display control for labeling work by a data set management unit 210 according to the embodiment.

Here, an example of screen display control for labeling work by the data set management unit 210 according to the present embodiment will be described with reference to FIGS. 4 and 5. FIG. 4 illustrates a display screen SC1 for labeling work by the data set management unit 210 in a case where the input/output terminal 10 is a personal computer.

The display screen SC1 for labeling work includes a display portion SP11 for displaying a labeling work situation, a display portion SP12 for displaying data including a recognition target, a display portion SP13 for displaying information regarding an erroneous recognition target under the control of the information processing server 40 to be described later, and a display portion SP14 for displaying information regarding an operation on the display screen for labeling work.

In the display portion SP11, a labeling work situation for the recognition target is displayed. In the example of FIG. 4, in the display portion SP11, information indicating a situation in which a "tomato" image included in image data displayed in the display portion SP12 is labeled is displayed. In the display portion SP12, data including the recognition target currently performing the labeling work is displayed. In the example of FIG. 4, the image data including the "tomato" image is displayed. Here, in a region of the labeled "tomato" image, display is performed so as to surround the region.

In the display portion SP13, information regarding the erroneous recognition target is illustrated under the control of the information processing server 40 described later. In the example of FIG. 4, an example of an image that a recognizer currently under development recognizes as a "tomato" is displayed. In the display portion SP14, various buttons and the like for operating the display screen in the labeling work are illustrated. In the example of FIG. 4, buttons for performing "region selection", "label deletion", "change of display image", "enlargement of display image", and "label confirmation" are displayed. Further, as illustrated in FIG. 4, in the display portion SP13, an information output avatar may be displayed.

Figure 5:
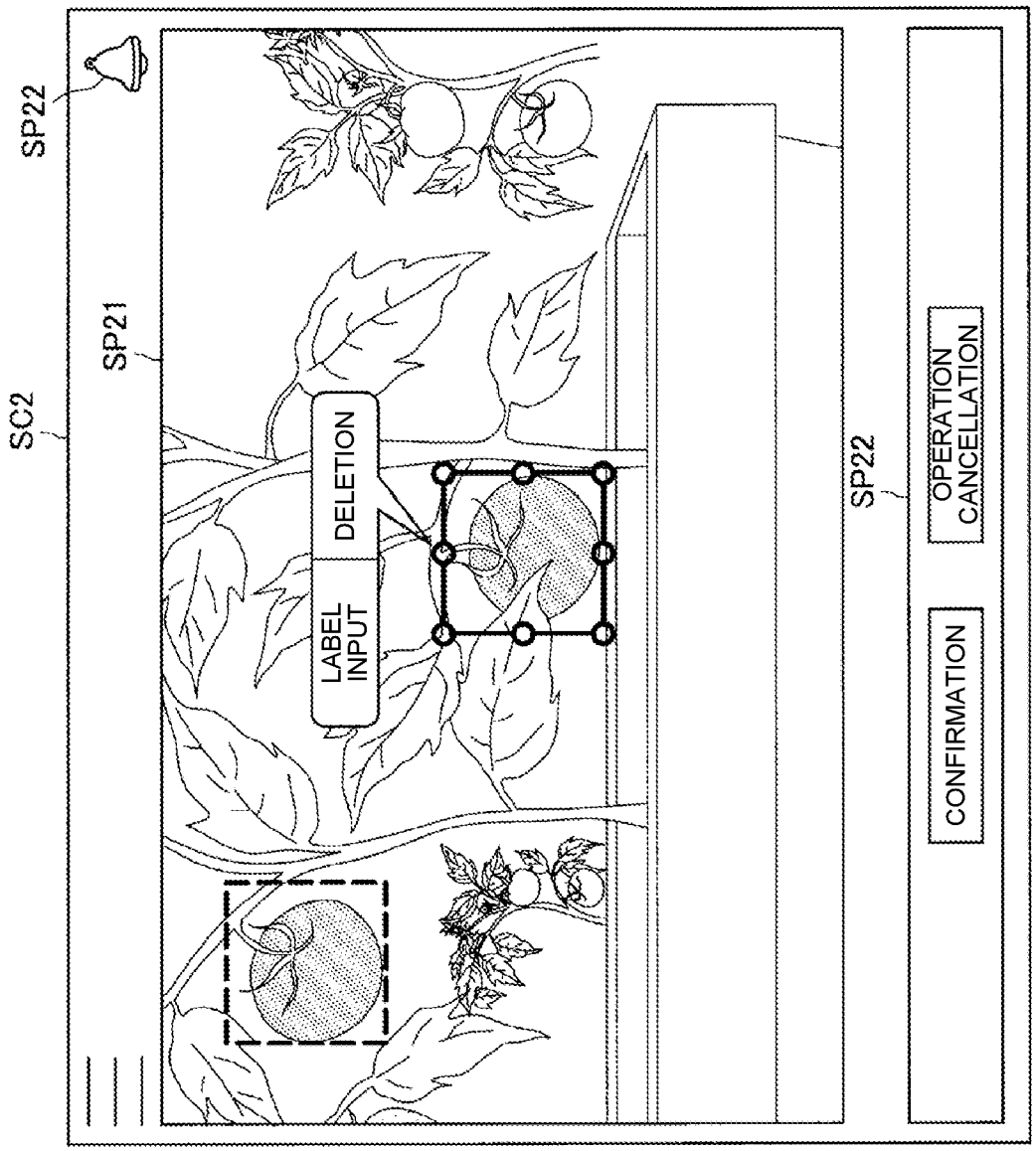
FIG. 5 is a diagram illustrating an example of screen display control for labeling work by the data set management unit 210 according to the embodiment.

On the other hand, FIG. 5 illustrates a display screen SC2 for labeling work by the data set management unit 210 in a case where the input/output terminal 10 is a smartphone or a tablet terminal. The layout of the display screen SC is partially different in that input by a touch operation is possible and a physical size of the screen is different from that of a personal computer. The display screen SC1 for labeling work includes a display portion SP21 for displaying a labeling work situation and a display portion SP22 for displaying information regarding an erroneous recognition target displayed under the control of the information processing server 40 described later.

In a case where the input/output terminal 10 is a smartphone or a tablet terminal, for example, information can be input by a touch operation for a region on a touch panel. Therefore, as illustrated in FIG. 5, the data set management unit 210 may display a balloon for confirming whether or not to input a label in a case where a touch operation is performed on the "tomato" image to be the recognition target in the display portion SP21.

Further, as illustrated in FIG. 5, the data set management unit 210 may display an icon on the upper right of the display screen SC2 as in the display portion SP22, and when the information regarding the erroneous recognition target is displayed, the data set management unit 210 may display the information in the format of a balloon.

As described above, display control of the screen for labeling work by the data set management unit 210 is executed. Note that a context corresponding to each piece of data may be set before the work of labeling each piece of data is started. The context may indicate a place such as a "farm", a "home garden", a "supermarket", a "bank", or a "school". Further, the context may indicate a time zone such as "morning" or "late night", or may indicate a predetermined scene such as "cooking" or "meeting". The context is set in a desired format.

Of course, the configuration of the screen for labeling work is not limited to such an example. The display of the information regarding the erroneous recognition target described above will be described in detail later.

Returning to FIG. 3 again, an example of the functional configuration of the recognizer development device 20 will be described.

(Recognizer Development Unit 220)

The recognizer development unit 220 executes processing related to development of a recognizer for recognizing a predetermined recognition target. Specifically, the recognizer development unit 220 provides an integrated development environment and an editor of the recognizer to the user via the input/output terminal 10, and performs designing and learning of the recognizer on the basis of input from the user via the input/output terminal 10. Further, the recognizer development unit 220 may set a context in which the recognizer to be developed is used when the recognizer is developed.

Furthermore, the recognizer development unit 220 may display an evaluation result of the recognizer to the user via the input/output terminal 10. Here, an example of screen display of the evaluation result of the recognizer by the recognizer development unit 220 according to the present embodiment will be described with reference to FIG. 6. FIG. 6 illustrates a display screen SC3 that displays the evaluation result of the recognition of the learning data by the recognizer displayed by the recognizer development unit 220.

In the example of FIG. 6, on the display screen SC3 that displays the evaluation result, learning data with which a recognition target has been labeled and evaluation of accuracy in recognition processing of the recognition target are illustrated as reliability. Here, the evaluation in the recognition processing is indicated by an index such as mean average precision (mAP) or intersection over union (IoU).

Further, as illustrated in the example of FIG. 6, the recognizer development unit 220 may display additional information regarding a context as a remark for the learning data. Here, the additional information refers to date and time, position information, a name of a place, and the like of shooting, in a case where the learning data is image data. Furthermore, the recognizer development unit 220 may display information indicating the context of the learning data described above as the additional information.

As described above, processing and display related to the development of the recognizer by the recognizer development unit 220 are performed. Of course, the configuration of the screen of the evaluation result of the recognizer is not limited to such an example.

Returning to FIG. 3 again, an example of the functional configuration of the recognizer development device 20 will be described.

(Communication Unit 240)

The communication unit 240 executes communication with the input/output terminal 10 or the information processing server 40. For example, the communication unit 240 transmits information regarding screen display to the input/output terminal 10, on the basis of an instruction from the data set management unit 210 or the recognizer development unit 220, and receives information indicating the input operation of the user from the input/output terminal 10.

(Storage Unit 250)

The storage unit 250 stores various types of information regarding the processing of the data set management unit 210 and the recognizer development unit 220. As described above, the storage unit 250 includes, for example, the learning data set DB 251 and the recognizer database 252. The storage unit 250 provides various types of data of the learning data set DB 251 and the recognizer database 252, on the basis of a request from the data set management unit 210 or the recognizer development unit 220.

(Control Unit 260)

The control unit 260 has a function of controlling each configuration included in the recognizer development device 20 according to the present embodiment. The control unit 260 controls, for example, the start or stop of each configuration.

The configuration example of the recognizer development device 20 according to the present embodiment has been described above. Note that the above configuration described using FIG. 3 is merely an example, and the configuration of the recognizer development device 20 according to the present embodiment is not limited to such an example. The configuration of the recognizer development device 20 according to the present embodiment can be flexibly modified according to specifications or operations.

2.3. Functional Configuration Example of Information Processing Server 40

Figure 7:
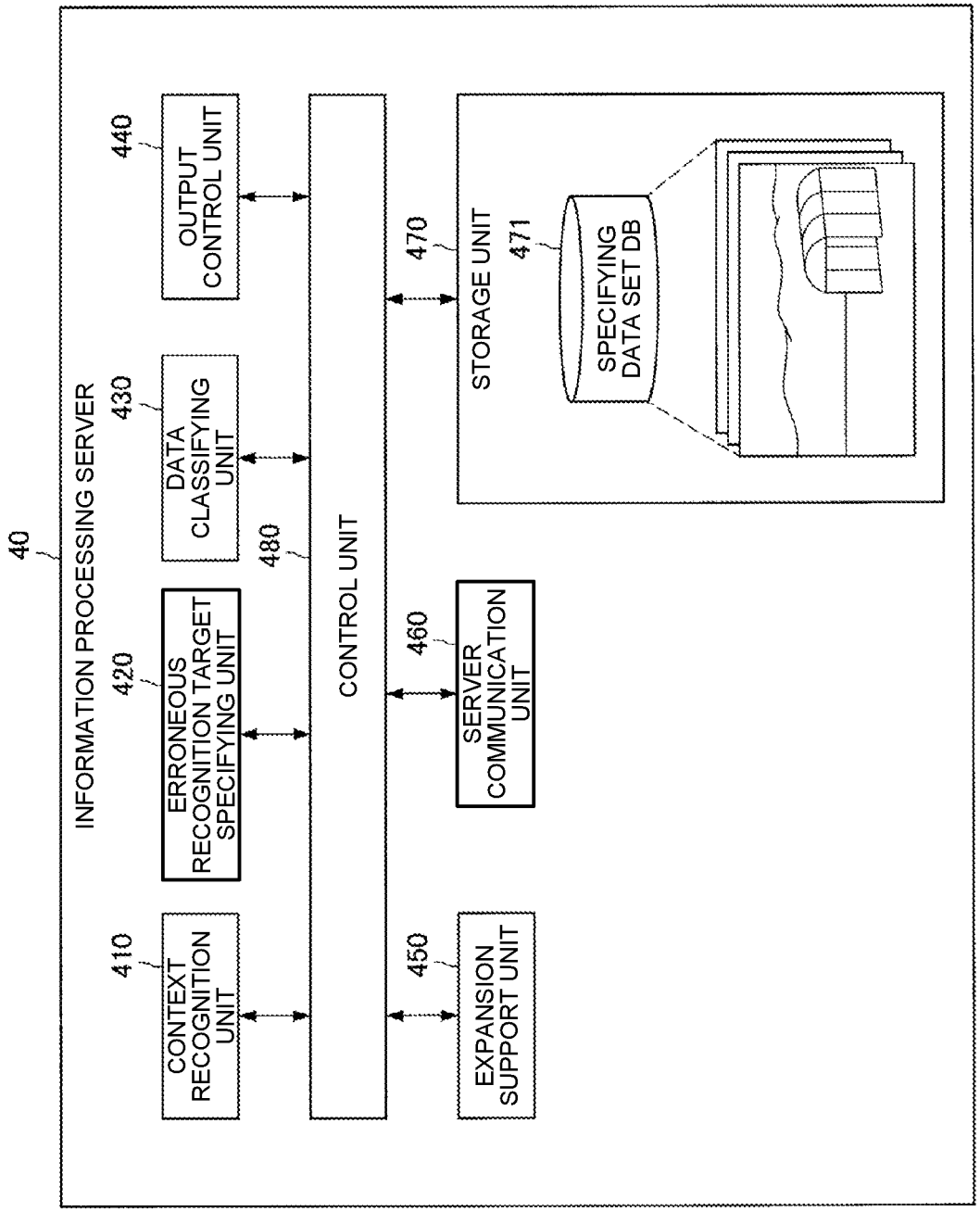
FIG. 7 is a diagram illustrating an example of a functional configuration of an information processing server 40 according to the embodiment.

Next, an example of a functional configuration of the information processing server 40 according to the present embodiment will be described with reference to FIG. 7. The information processing server 40 includes a context recognition unit 410, an erroneous recognition target specifying unit 420, a data classifying unit 430, an output control unit 440, an expansion support unit 450, a server communication unit 460, a storage unit 470, and a control unit 480.

(Context Recognition Unit 410)

The context recognition unit 410 recognizes a context of the learning data received from the recognizer development device 20. For example, the context recognition unit 410 may recognize a context corresponding to the learning data and set in advance. Further, for example, the context recognition unit 410 may recognize the context of the learning data on the basis of the learning data. For example, in a case where the learning data is image data, the context recognition unit 410 may recognize the context of the learning data, on the basis of a background portion different from a target that can be recognized by the recognizer in the image data. The context of the learning data is recognized by the context recognition unit 410, so that the specification of the erroneous recognition target by the erroneous recognition target specifying unit 420 described later is more accurately executed.

Note that context recognition processing by the context recognition unit 410 is not limited to such an example. For example, when the context of the image data is recognized, the context recognition unit 410 may use clothes of a person in the image, character information of a subtitle or a signboard, or the like, in addition to the background of the image. Further, the context recognition unit 410 may recognize the context on the basis of surrounding information such as a date when an image is created or captured, a voice, a temperature, a humidity, a place, a country, and position information acquired by a global positioning system (GPS), which are added to the learning data as additional information. The context is recognized by various types of information, so that it is easy to specify an erroneous recognition target that conforms to the purpose of the user.

Note that, when the learning data set is received from the recognizer development device 20, the context recognition unit 410 recognizes a context common to the learning data forming the learning data set. In a case where all contexts are not substantially the same in a plurality of pieces of learning data, for example, a context occupying the majority of the plurality of pieces of learning data may be recognized by the context recognition unit 410 as the context of the entire learning data, or a context indicating an intermediate concept of the contexts of the plurality of pieces of learning data may be recognized by the context recognition unit 410 as the context of the entire learning data.

Note that data in the context to be substantially the same as the context recognized by the context recognition unit 410 on the basis of the learning data set is acquired as specifying data from the specifying data set DB 471 of the storage unit 470 to be described later, by the erroneous recognition target specifying unit 420 to be described later. At that time, the context recognition unit 410 may recognize the context of the data included in the specifying data set DB 471.

(Erroneous Recognition Target Specifying Unit 420)

The erroneous recognition target specifying unit 420 uses the recognizer to specify an erroneous recognition target by recognition processing on specifying data.

Specifically, the erroneous recognition target specifying unit 420 specifies the erroneous recognition target by executing the recognition processing on the specifying data using the recognizer and using a result obtained by causing the data classifying unit 430 described later to execute clustering processing, on the basis of a result of the recognition processing.

Hereinafter, specific processing of the erroneous recognition target specifying unit 420 will be described.

The erroneous recognition target specifying unit 420 extracts data in a context to be substantially the same as the context recognized by the context recognition unit 410 from the specifying data set DB 471 of the storage unit 470 as specifying data. Here, the erroneous recognition target specifying unit 420 may acquire the specifying data on the basis of the context included in the specifying data set DB 471 and set in advance in the data, or may acquire the specifying data on the basis of a result obtained by causing the context recognition unit 410 to recognize the context of the data.

Further, the erroneous recognition target specifying unit 420 specifies a target included in specifying data erroneously recognized by the recognizer as an erroneous recognition target, on the basis of results of recognition processing of the recognition target of the specifying data by the recognizer and clustering processing by the data classifying unit 430. Details of the clustering processing by the data classifying unit 430 will be described later.

In order to specify the erroneous recognition target, for example, an accuracy evaluation result of the recognition processing by the recognizer of the target in each cluster is used for the target in the specifying data classified into each cluster by the clustering processing. For example, the erroneous recognition target is specified on the basis of an average value of accuracy evaluation of recognition processing of the target recognized by the recognizer in the specifying data in the cluster.

(Data Classifying Unit 430)

The data classifying unit 430 executes clustering processing, which is a method of so-called unsupervised machine learning, on the target included in the specifying data recognized by the erroneous recognition target specifying unit 420 using the recognizer, and classifies the target included in the specifying data into a plurality of clusters by the executed clustering processing. For example, in a case where the specifying data is image data, the data classifying unit 430 executes clustering processing to predetermined regions in the specifying data recognized by the erroneous recognition target specifying unit 420 using the recognizer, and classifies each predetermined region into any one of a plurality of clusters. Examples of the method of the clustering processing include a principal component analysis method, a k-means method, and the like.

Example of Specifying Erroneous Recognition Target

Here, an example of specifying an erroneous recognition target by the erroneous recognition target specifying unit 420 and the data classifying unit 430 according to the present embodiment will be described with reference to FIGS. 8 and 9.

Figure 8:
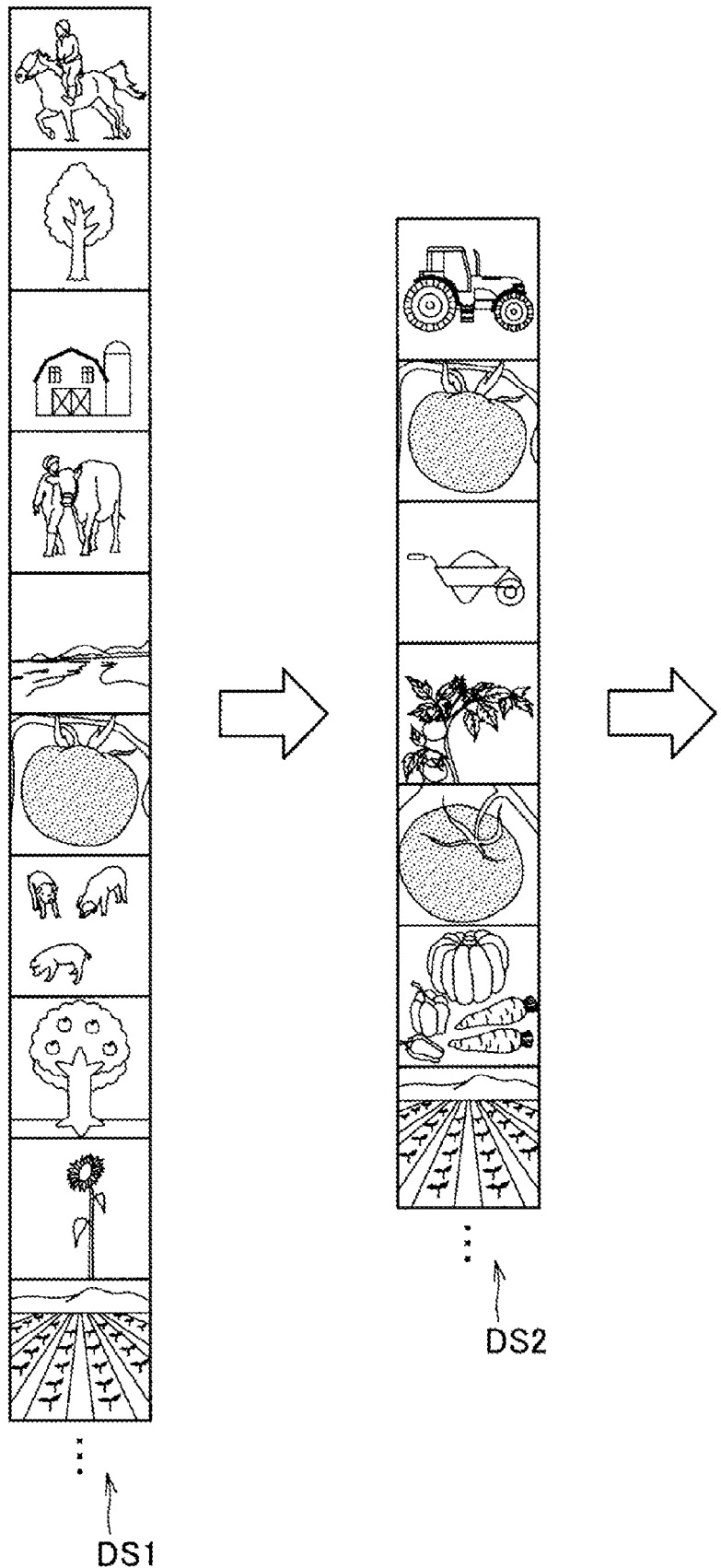
FIG. 8 is a diagram illustrating an example of specifying an erroneous recognition target by an erroneous recognition target specifying unit 420 and a data classifying unit 430 according to the embodiment.

FIG. 8 is a diagram illustrating processing of extracting data of a context to be substantially the same as a context of learning data as specifying data by the erroneous recognition target specifying unit 420. FIG. 8 illustrates an image data set DS1 in the specifying data set DB 471. The image data set DS1 may be an image data set whose context is "farm", and the image data set DS1 may be an image data set whose context is other than "farm". The erroneous recognition target specifying unit 420 extracts, as specifying data, image data whose context is "garden" in which a vegetable or the like is produced from the image data set DS1. An image data set DS2 illustrated on the right side of FIG. 8 is a specifying data set whose context is "garden".

Next, the erroneous recognition target specifying unit 420 recognizes the target by executing the recognition processing using the recognizer received from the recognizer development device 20 on the image data set DS2. On the left side of FIG. 9, a result table TA of the recognition processing on the image data set DS2 by the erroneous recognition target specifying unit 420 is illustrated. Note that, in the examples of FIGS. 8 and 9, the "home garden" and the "garden" are treated as substantially the same context.

Figure 9:
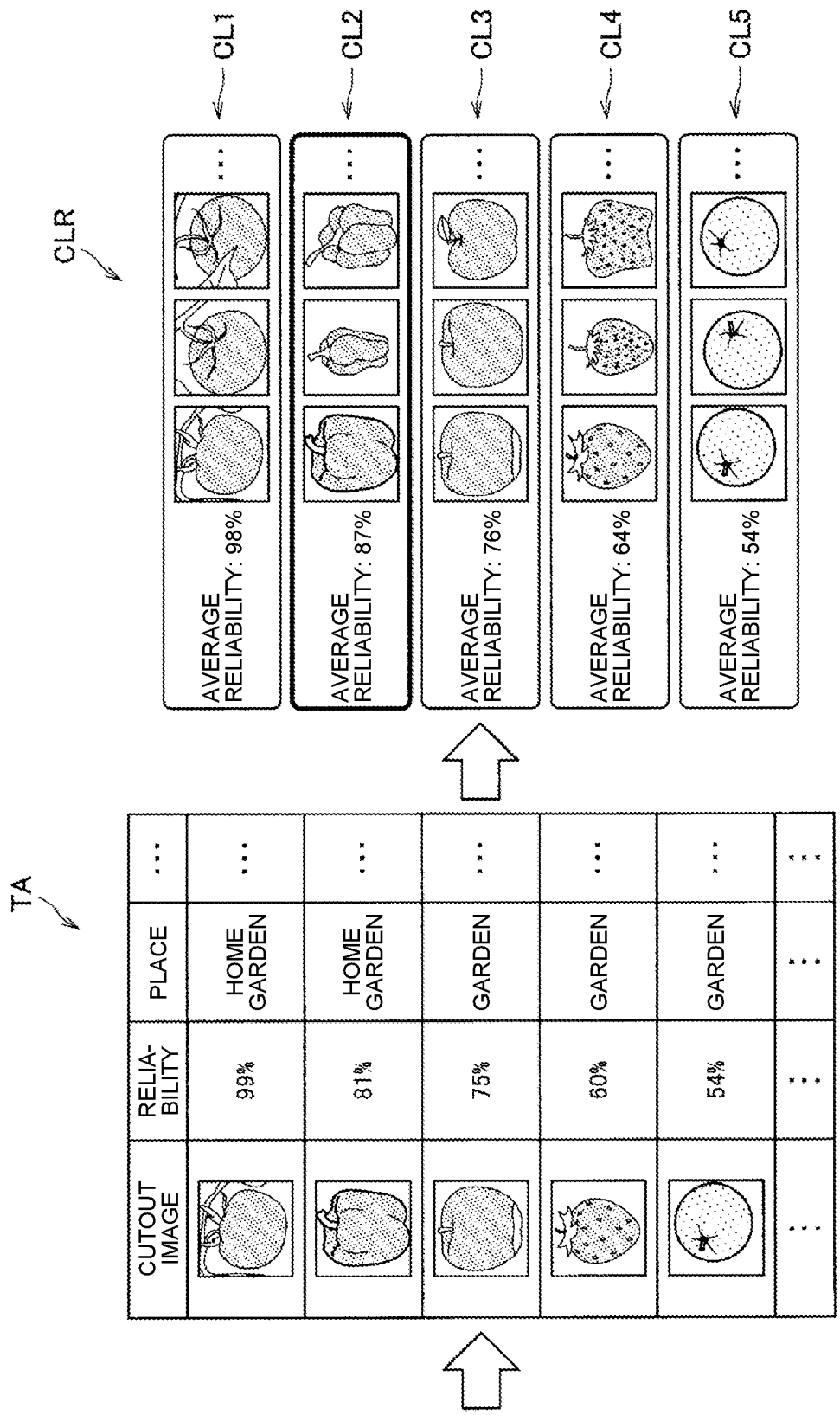
FIG. 9 is a diagram illustrating an example of specifying an erroneous recognition target by the erroneous recognition target specifying unit 420 and the data classifying unit 430 according to the embodiment.

The data classifying unit 430 executes clustering processing on the recognized target region (cutout image) included in the result of the recognition processing illustrated on the left side of FIG. 9. Each cutout image is classified into any one of a plurality of clusters by the clustering processing of the data classifying unit 430. Further, as illustrated on the right side of FIG. 9, the erroneous recognition target specifying unit 420 calculates an average of reliabilities of the recognition processing corresponding to a plurality of cutout images included in each cluster. In a cluster column CLR illustrated on the right side of FIG. 9, cutout images classified into clusters CL1 to CL5 and average reliability corresponding to each cluster are illustrated.

On the right side of FIG. 9, the erroneous recognition target specifying unit 420 specifies the erroneous recognition target on the basis of the average reliability to be recognition accuracy calculated. Here, since there is a high possibility that the target of the cutout image of the cluster CL1 having the highest average reliability is the recognition target to be recognized by the recognizer, the target of the cluster CL2 having the second highest average reliability may be specified as the erroneous recognition target. In the example of FIG. 9, the cluster CL1 is an image of "tomato", and the cluster CL2 is an image of "paprika". Here, the erroneous recognition target specifying unit 420 specifies the target of the cluster CL2 having the second highest reliability after the cluster CL1 as the erroneous recognition target.

As described above, it is possible to further specify the erroneous recognition target that may be erroneously recognized when the recognition processing is performed by the recognizer in the context in which the erroneous recognition target is substantially the same as the learning data. Note that the method for specifying the erroneous recognition target based on the recognition accuracy described above is not limited to such an example. In the above description, an example has been described in which the target corresponding to the cluster having the second highest average reliability, which is the average of recognition accuracy, is set as the erroneous recognition target. However, for example, in a case where there is a high possibility that a recognition target is divided into two or more clusters and classified, a target corresponding to a cluster having the third highest recognition accuracy or lower may be specified as the erroneous recognition target.

A functional configuration of the information processing server 40 according to the present embodiment will be described with reference to FIG. 7 again.

(Output Control Unit 440)

The output control unit 440 controls display of information regarding the erroneous recognition target specified by the erroneous recognition target specifying unit 420.

For example, the information regarding the erroneous recognition target may be notification information for notifying the user of the erroneous recognition target. The output control unit 440 may control the display of the notification information on the basis of a specifying result by the erroneous recognition target specifying unit 420. The notification information may be visual information or character information. In a case where the learning data is image data, the notification information may be a portion (clipped image) of the image data corresponding to the erroneous recognition target as the visual information. Further, in a case where there is a plurality of pieces of data indicating the erroneous recognition target in the cluster, the output control unit 440 may display the plurality of pieces of data.

Further, the information regarding the erroneous recognition target may be additional information related to the erroneous recognition target, in addition to the information indicating the erroneous recognition target. For example, the output control unit 440 may control display of information indicating an evaluation on the result of the recognition processing on the specifying data by the recognizer as information regarding the erroneous recognition target.

Further, the output control unit 440 may further control display of information indicating the context of the learning data. As described above, examples of the information indicating the context include information notifying the context and surrounding information such as a date, a voice, a temperature, a humidity, and position information acquired by GPS. By grasping the context of the specifying data, the user can consider what type of learning data should be prepared or in which situation or situation the learning data should be expanded.

Further, the output control unit 440 may control display of information regarding expansion of the learning data set by the expansion support unit 450 described later. The control of the display of the information regarding the expansion will be described in detail later.

Note that the output control unit 440 may control display of the entire screen other than an information portion regarding the erroneous recognition target in the display screens SC1 to SC3 illustrated in FIGS. 4 to 6 described above, instead of the recognizer development device 20.

Note that, in addition to the visual information described above, the output control unit 440 may output, to the user, information regarding the erroneous recognition target or the like by a voice. Further, the output control unit 440 may output information regarding the erroneous recognition target and the like to the user only by a voice.

(Expansion Support Unit 450)

The expansion support unit 450 controls expansion processing of the learning data on the basis of a specification result of the erroneous recognition target specifying unit 420. Here, the expansion processing of the learning data set DB 251 refers to adding new learning data to the learning data set DB 251. That is, the expansion support unit 450 may add, for example, a combination of labels corresponding to the learning data of the erroneous recognition target specified by the erroneous recognition target specifying unit 420 to the learning data set DB 251 as the learning data set. Here, the label may be given by the user or may be automatically given by the expansion support unit 450.

Output Control Example and Expansion Processing Example

As described above, in the expansion support unit 450, the output control unit 440 may control the display of the information regarding the expansion of the learning data and execute the expansion processing of the learning data, on the basis of the feedback from the user on the information regarding the expansion.

For example, the expansion support unit 450 may execute the expansion processing of the learning data set, on the basis of the feedback from the user for information regarding confirmation as to whether or not the erroneous recognition target displayed by the output control unit 440 is erroneously recognized. At that time, the learning data set expanded in the learning data set DB 251 may be the same as the data of the erroneous recognition target. The data of the erroneous recognition target is labeled differently from the recognition target and expanded as the learning data, so that the possibility of erroneous recognition of the recognizer is reduced, and as a result, a more accurate recognizer can be developed.

For example, as illustrated in FIG. 4 described above, the output control unit 440 displays an image and a sentence for confirming whether or not the erroneous recognition target is a target to be recognized so as to be included in the display portion SP13 via the recognizer development device 20. By inputting "Yes" or "No" to the display portion SP13, the user can determine whether or not the recognizer recognizes the displayed image (target).

Display examples of the information regarding the erroneous recognition target and the information regarding the expansion are not limited to such examples. FIG. 4 illustrates a display screen example in a case where the input/output terminal 10 is a personal computer. Here, a display example of information regarding the erroneous recognition target and information regarding the expansion in a case where the input/output terminal 10 according to the present embodiment is a smartphone or a tablet terminal will be described with reference to FIG. 10.

Figure 10:
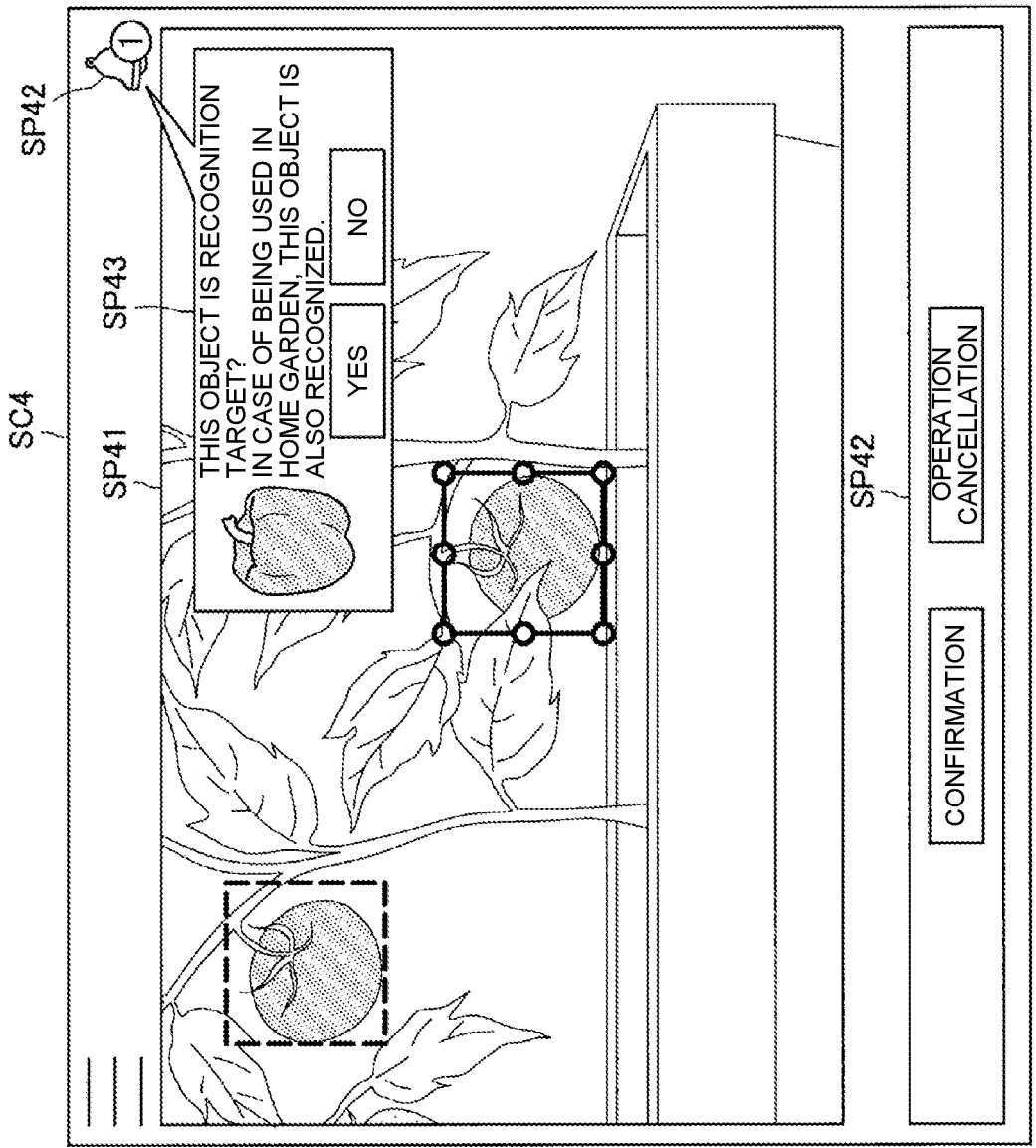
FIG. 10 is a diagram illustrating a display example of information regarding an erroneous recognition target and information regarding expansion in a case where an input/output terminal 10 according to the embodiment is a smartphone or a tablet terminal.

In FIG. 10, a display screen SC4 for labeling work includes a display portion SP41 for displaying a labeling work situation and a display portion SP42 for displaying information regarding the erroneous recognition target. Unlike the display screen SC2 of FIG. 5, a portion SP43 that displays information indicating the erroneous recognition target and information for confirming the erroneous recognition target is illustrated in the format of a balloon, on the basis of the display portion SP42. As described above, the layout of the various table screens can be changed according to the type of the input/output terminal 10.

Further, for example, on the display screen SC4 for labeling work, the output control unit 440 may display a message actively suggesting expansion of learning data, such as "By performing learning so as not to detect this object, recognition accuracy increases".

Figure 11:
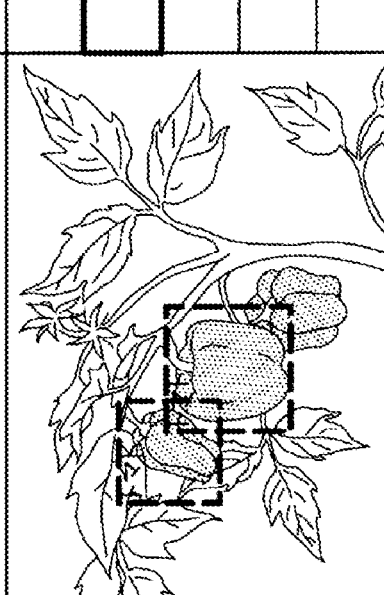
FIG. 11 is a diagram illustrating a display example of information regarding expansion at the time of design and learning of the recognizer according to the embodiment.

The display screen illustrated in FIGS. 4 and 10 is a display screen at the time of constructing the learning data set. On the other hand, the output control unit 440 may control the display of the information regarding the expansion by the expansion support unit 450 at the time of designing and learning the recognizer. Here, an example of display of information regarding the expansion at the time of designing and learning of the recognizer according to the present embodiment will be described with reference to FIG. 11. FIG. 11 illustrates a display screen SC5 of the evaluation result of the recognizer.

The display screen SC3 of the evaluation result of the recognizer illustrated in FIG. 6 described above is an evaluation result of the recognition processing on the learning data, while the display screen SC5 illustrated in FIG. 11 is an evaluation result of the recognition processing on the specifying data including the erroneous recognition target. In the example of FIG. 11, two erroneous recognition targets (paprika different from tomato to be the recognition target) are illustrated on the display screen SC5.

Here, the user can input the feedback to the accuracy evaluation result illustrated on the display screen SC5. For example, the expansion support unit 450 may control the expansion processing of the learning data set DB 251, on the basis of input from the user as to whether or not the accuracy evaluation result is as expected.

In a case where "expected detection" is input in a display portion SP43, the expansion support unit 450 may determine that the displayed erroneous recognition target is actually a recognition target and add the erroneous recognition target with the same label as the recognition target to the learning data set DB 251 as the learning data. On the other hand, when "unexpected detection" is input in the display portion SP43, the expansion support unit 450 may determine that the erroneous recognition target is actually an erroneously recognized target, perform another labeling, and add the erroneous recognition target to the learning data set DB 251. Note that the format of input from the user may be a format of selection from predetermined options as illustrated in FIG. 11, or a format of input by a keyboard shortcut of the input/output terminal 10.

As described above, the information regarding the erroneous recognition target is displayed by the output control unit 440, so that the user can confirm at an early stage what type of target is erroneously recognized by the current learning data set and recognizer, and what type of data should be added as the learning data. Further, expansion of the learning data according to the erroneous recognition target specified by the erroneous recognition target specifying unit 420 is realized by the expansion support unit 450.

Further, according to the output control unit 440 and the expansion support unit 450, the expansion of the learning data can be performed at the stage of construction of the learning data set or designing and developing of the recognizer on the basis of whether or not the erroneous recognition target is actually an erroneously recognized target, and the development period can be shortened. Further, active learning in which the user actively understands the importance of securing the amount or diversity of learning data in the development of the recognizer is realized by the output control unit 440 and the expansion support unit 450.

The exchange of information with the user via the input/output terminal 10 by the output control unit 440 may be performed a plurality of times. For example, by grasping a more detailed context in which the recognizer is used by exchanging information with the user, the expansion support unit 450 can more accurately specify data to be expanded as the learning data set.

The output control example and the expansion processing example have been described above. Returning to FIG. 7 again, the functional configuration of the information processing server 40 will be described.

(Server Communication Unit 460)

The server communication unit 460 executes communication with the recognizer development device 20 via the network 30. For example, the server communication unit 460 receives the recognizer and the learning data set from the recognizer development device 20 via the network 30, and transmits information regarding the erroneous recognition target or specifying data including the erroneous recognition target to the recognizer development device 20.

(Storage Unit 470)

The storage unit 470 stores the specifying data set DB 471 and the like. The specifying data set DB 471 is a set of data and information associated with the data. The information associated with the data is, for example, information indicating a context of the data. A combination of the data and the information indicating the context or the like is also referred to as a specifying data set.

The storage unit 470 may provide data in a predetermined context on the basis of the request from the context recognition unit 410 and the information indicating the context. Here, the provided data in the predetermined context is the above-described specifying data. Further, the storage unit 470 may provide the data of the specifying data set DB 471 to the context recognition unit 410 to recognize the context, on the basis of the request from the context recognition unit 410.

Note that each data of the specifying data set DB 471 may not be data prepared for development of the recognizer. That is, in specifying the erroneous recognition target, the erroneous recognition target specifying unit 420 may acquire and use data used for other purposes.

(Control Unit 480)

The control unit 480 has a function of controlling each configuration included in the information processing server 40 according to the present embodiment. The control unit 260 controls, for example, the start or stop of each configuration.

2.4. Operation Example

2.4.1. Operation Example 1

Figure 12:
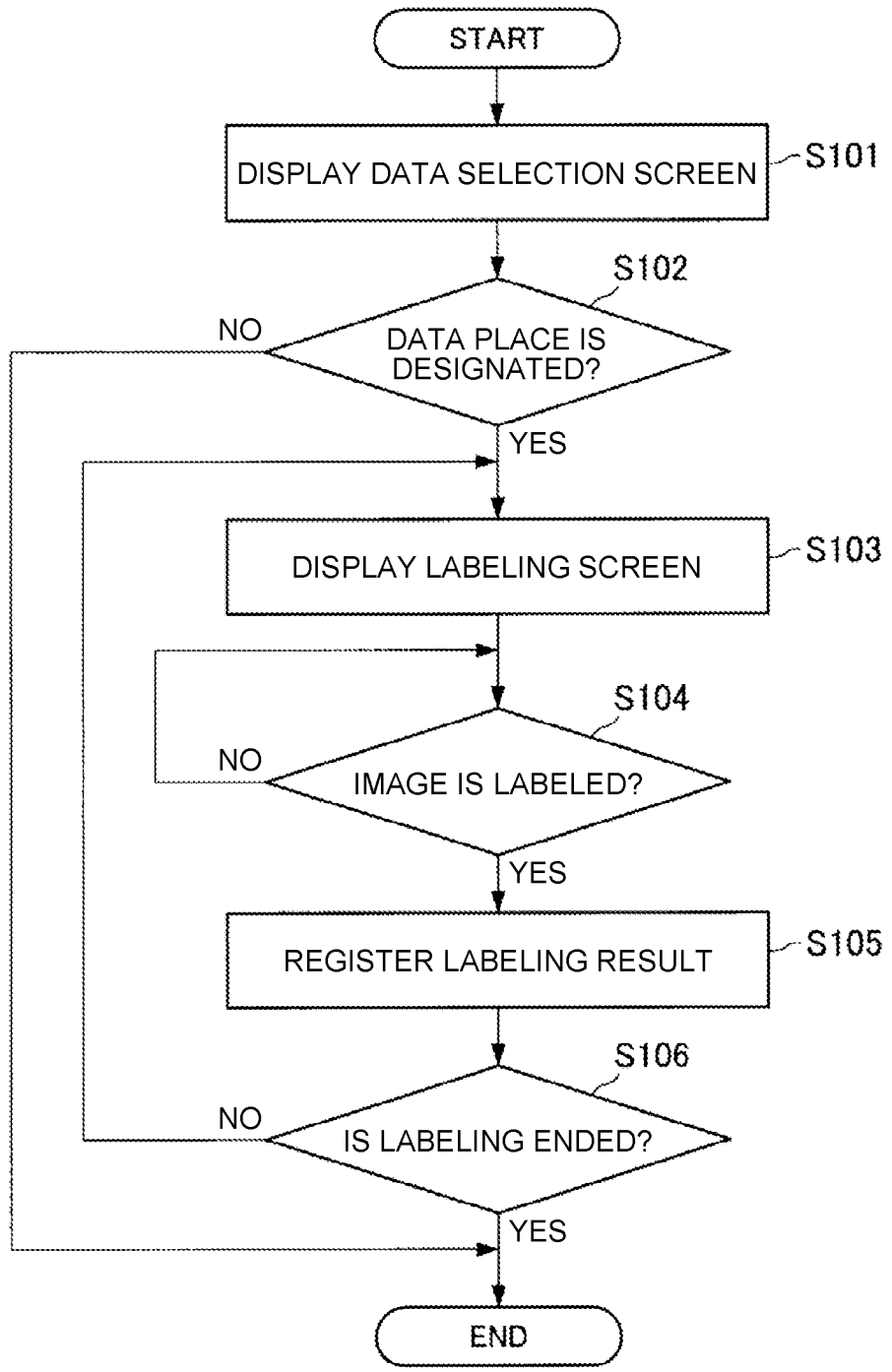
FIG. 12 is a diagram illustrating an example of an operation related to labeling work for learning data by the data set management unit 210 according to the embodiment.

Next, an example of the operation related to the work of labeling the learning data by the data set management unit 210 according to the present embodiment will be described. Referring to FIG. 12, first, after the start of an application performing labeling, the data set management unit 210 of the recognizer development device 20 causes the input/output terminal 10 to display a screen prompting designation of a place where the learning data set DB 251 is stored (S101).

When the place where the learning data set DB 251 is stored is not designated (S102: No), it is determined that the labeling work is not performed, and the data set management unit 210 ends the operation. On the other hand, when the place where the learning data set DB 251 is stored is designated (S102: Yes), the data set management unit 210 causes the input/output terminal 10 to display a labeling screen (S103).

Next, when the operation of labeling the image of the learning data displayed on the labeling screen displayed in step S103 is not input (S104: No), the process returns to step S104. On the other hand, when the operation of labeling the image of the learning data displayed on the labeling screen displayed in step S103 is input (S104: Yes), the data set management unit 210 registers a labeling result as the learning data set (S105).

Next, when the labeling is continued (S106: No), the process returns to step S103. On the other hand, when the labeling ends (S106: Yes), the data set management unit 210 ends the operation.

2.4.2. Operation Example 2

Figure 13:
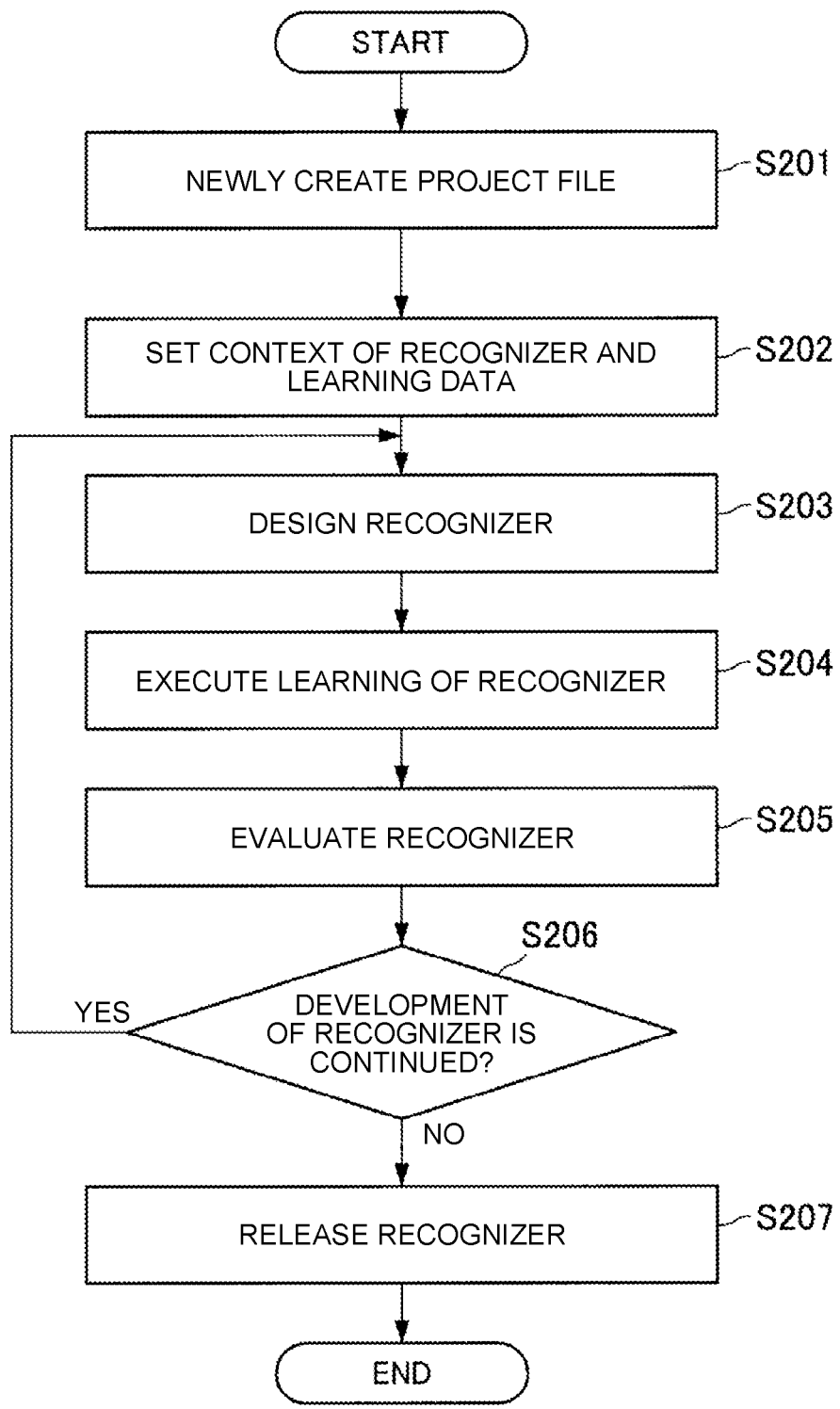
FIG. 13 is a diagram illustrating an example of an operation related to labeling work for learning data by the recognizer development unit 220 according to the embodiment.

Next, an example of the operation related to the work of labeling the learning data by the recognizer development unit 220 according to the present embodiment will be described. Referring to FIG. 13, first, the recognizer development unit 220 of the recognizer development device 20 newly creates a project file for developing the recognizer (S201). Next, the recognizer development unit 220 sets the context of the recognizer and the learning data (S202). Next, the recognizer development unit 220 executes designing processing of the recognizer on the basis of input from the user or the like (S203).

Next, the recognizer development unit 220 executes learning of the recognizer on the basis of the learning data (S204). Next, the recognizer development unit 220 evaluates the accuracy of the recognition processing of the recognizer of which the learning has been executed in step S204 (S205). Next, when the development of the recognizer is continued on the basis of the input from the user (S206: Yes), the process returns to step S203. On the other hand, next, when the development of the recognizer is ended on the basis of the input from the user (S206: No), the recognizer development unit 220 releases the recognizer to a developer or a customer (S207), and the recognizer development unit 220 ends the operation.

2.4.3. Operation Example 3

Figure 14:
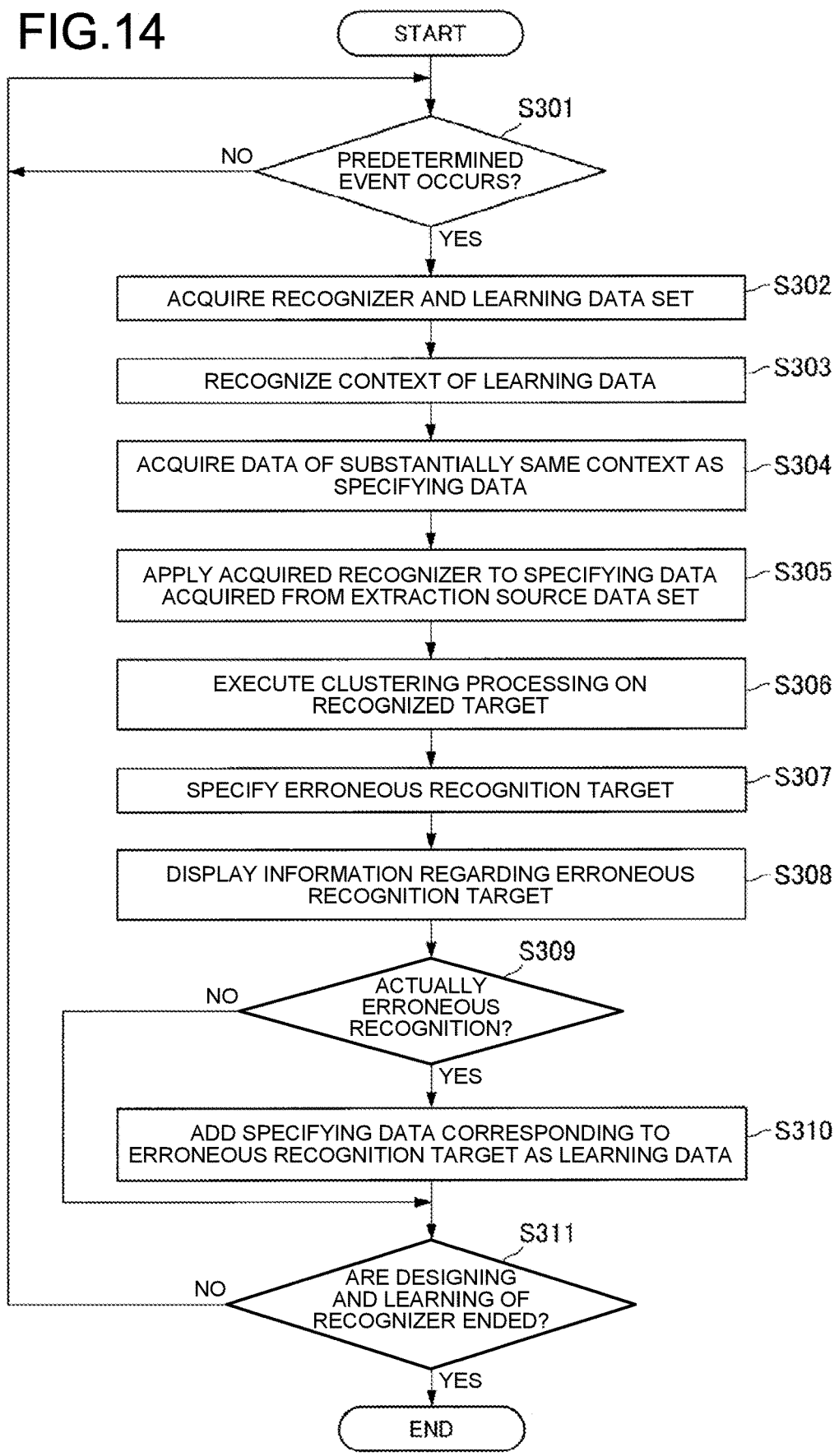
FIG. 14 is a diagram illustrating an example of an operation related to labeling work for learning data by the recognizer development unit 220 according to the embodiment.

Next, an example of an operation related to specification of an erroneous recognition target, presentation of information regarding the erroneous recognition target, and expansion of a learning data set by the information processing server 40 according to the present embodiment will be described. Referring to FIG. 14, first, when the server communication unit 460 does not receive information indicating the occurrence of a predetermined event from the recognizer development device 20 (S301: No), the process returns to step S301. Here, examples of the predetermined event include completion of designing and learning of the recognizer by the recognizer development device 20, a change in setting of a project file for developing the recognizer, and the like. On the other hand, when the server communication unit 460 receives the information indicating the occurrence of the predetermined event from the recognizer development device 20 (S301: Yes), the erroneous recognition target specifying unit 420 acquires the recognizer and the learning data set via the server communication unit 460 (S302).

Next, the context recognition unit 410 recognizes a context of the learning data acquired in step S302 (S303). Next, the erroneous recognition target specifying unit 420 acquires data of a context to be substantially the same as the context recognized in step S303 from the specifying data set DB 471 of the storage unit 470 as specifying data (S304). Next, the erroneous recognition target specifying unit 420 applies the recognizer acquired in step S302 to the specifying data acquired in step S304 (S305).

Next, the data classifying unit 430 executes clustering processing on the target recognized in step S305 (S306). Next, the erroneous recognition target specifying unit 420 specifies an erroneous recognition target on the basis of a result of the clustering processing executed in step S306 (S307). Next, the output control unit 440 causes the input/output terminal 10 to display information regarding the erroneous recognition target specified in step S307 (S308).

When there is input from the user for the information regarding the erroneous recognition target displayed in step S308 that the erroneous recognition target is actually the erroneously recognized target (S309: Yes), the expansion support unit 450 adds the specifying data including the erroneous recognition target specified in step S307 to the learning data set (S310). On the other hand, in a case where it is determined that the erroneous recognition target is not actually the erroneously recognized target, when there is input from the user for the information regarding the erroneous recognition target displayed in step S308 (S309: No), the process proceeds to step S311. Next, when designing and development of the recognizer are continued (S311: No), the process returns to step S301. On the other hand, when designing and development of the recognizer end (S311: Yes), the information processing server 40 ends the operation.

2.5. Modification

2.5.1. First Modification

Next, modifications of the embodiment of the present disclosure will be described. In the above description, the target recognized by the recognizer is the portion in the still image. In other words, in the above description, the target recognized by the recognizer is the type of the object. However, the scope of application of the technical ideas according to the present disclosure is not limited to such an example. The technical ideas according to the present disclosure are applicable to various recognition processing. For example, the learning data may be voice data, and the recognition target in this case is a predetermined phrase, a word portion, or the like in the voice data.

Further, for example, the learning data may be motion data or action data, and the recognition target may be a predetermined gesture performed by a person in moving image data. In this case, the learning data is collected by, for example, an inertial measurement unit (IMU). The IMU is worn on a person's arm, for example. Further, the gesture is, for example, a motion of raising an arm or the like.

Here, an example of screen display related to an erroneous recognition target in a case where learning data is motion data in a modification of the embodiment of the present disclosure will be described with reference to FIG. 15. FIG. 15 illustrates a display screen SC6 displayed by the output control unit 440. On the display screen SC6, time-series data of the IMU, a moving image time-synchronized with the time-series data, a probability that a predetermined gesture is being executed, and an average probability of a gesture as recognition accuracy are displayed as motion data, instead of the still image displayed in the above examples.

The user confirms whether or not the recognized gesture is erroneously recognized while confirming the moving image displayed on the display screen SC6. For example, in a case where a pointing operation is performed on the displayed recognition result, a moving image of a portion corresponding to the operated portion may be reproduced. Further, similarly to the above, the learning data may be expanded on the basis of the feedback from the user on the recognition result.

Note that the target recognized by the recognizer in the present disclosure is not limited to such an example. The target recognized by the recognizer may be, for example, document data. In this case, the recognized target is a predetermined sentence, phrase, or word in the document data. At this time, the data classifying unit 430 may use, for example, a classification vocabulary table at the time of the clustering processing.

2.5.2. Second Modification

Incidentally, in a case where a recognition target in a predetermined context is changed after the development of a recognizer that recognizes the recognition target in the predetermined context is completed, there is a possibility that the accuracy of the recognizer is lowered.

Examples of a situation in which a change in the recognition target is generated and the accuracy of the recognizer is lowered include the following.

For example, in a case where a variety of vegetables grown in a garden is changed, or in a case where fashion of clothes of a person, fashion of music, or the like is changed, there is a possibility that accuracy of a recognizer that recognizes the vegetables or a recognizer that recognizes the clothes of the person and the music is lowered. In addition, for example, even in a case where the variety of the vegetable grown in the garden is not changed, the appearance of the vegetable may change with the lapse of time such as a change in season, and even in a case where the recognizer is developed only on the basis of image data of the vegetable at a certain time point, the accuracy of the recognizer may be lowered.

Further, even in a case where the context of the recognition target changes, the accuracy of the recognizer may be lowered. For example, even in a case where a place in which the vegetables and the like are mainly produced is changed (in a case where the garden is changed to a factory) or a case where a country is changed, there is a possibility that the accuracy of the recognizer is lowered due to a change in the recognition target or a change in a target to be easily erroneously recognized in accordance with a change in the context.

Therefore, for the above situation, the expansion support unit 450 may control the expansion processing of the learning data set on the basis of the update of the specifying data set DB 471.

Specifically, in a case where a change occurs in the data forming the specifying data set DB 471, the expansion support unit 450 may control the expansion processing on the basis of an erroneous recognition target newly specified by the erroneous recognition target specifying unit 420. For example, in a case where the contents of the specifying data set DB are changed, the accuracy change of the recognition processing of the recognizer may be displayed in accordance with the change, and the learning data set may be expanded in accordance with the accuracy change.

Further, the output control unit 440 may control display of information regarding the update of the specifying data set DB 471. The expansion support unit 450 may control the expansion processing on the basis of the feedback to the information regarding the update of the specifying data set DB 471 displayed by the output control unit 440.

Here, an example of screen display of information regarding the update of the specifying data set DB 471 by the output control unit 440 in the modification of the embodiment of the present disclosure will be described with reference to FIG. 16. FIG. 16 illustrates a display screen SC7 that displays information regarding the update of the specifying data set DB 471.

On the display screen SC7, information regarding a recognizer under development or already developed and a corresponding specifying data set DB is displayed. Further, on the display screen SC7, a status corresponding to a combination of each recognizer and the specifying data set DB is also displayed. The status indicates the status of the recognizer. Here, the status of the recognizer is the accuracy of recognition processing of the recognizer or the like.

For example, in a case where the status is "running", it indicates that the accuracy evaluation of the corresponding recognizer is being executed. Further, for example, in a case where the status is "accuracy maintenance", it indicates that the accuracy of the recognition processing of the recognizer is not changed by the update of the specifying data set DB 471. Further, for example, in a case where the status is "accuracy decrease", it indicates that the accuracy of the recognition processing of the recognizer is decreased by the update of the specifying data set DB 471.

As described above, by displaying the information regarding the update of the specifying data set DB 471, for example, it is possible to confirm a situation change in a context in which the recognizer is used such as a change in fashion, and it is possible to perform the replenishment of the learning data or designing of the recognizer at an early stage. Further, according to a request from the user, the learning data set can be automatically expanded on the basis of the update of the specifying data set DB 124.

Although the modifications according to the present disclosure have been described above, the output control unit 440 may also perform, for the expansion of the learning data set, proposal for purchase of specifying data, proposal for transfer of securities, or the like to the user. Further, in a case where the target recognized by the recognizer is three-dimensional data, the output control unit 440 may cause a 3D printer connected to the recognizer development device 20 to generate a model, on the basis of the three-dimensional data corresponding to the erroneous recognition target or the like.

3. Hardware Configuration Example

Figure 17:
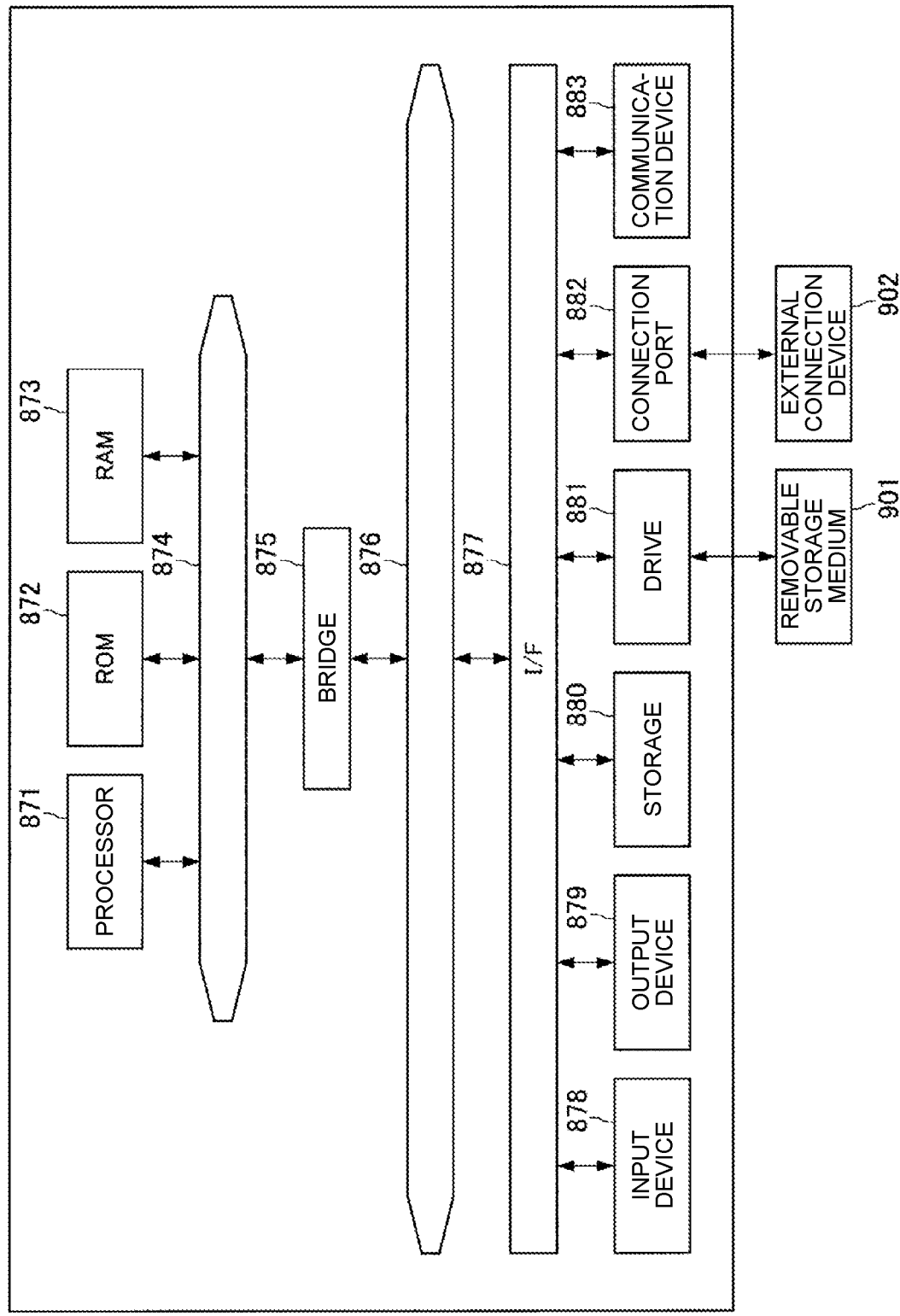
FIG. 17 is a block diagram illustrating a hardware configuration example common to the input/output terminal 10, the recognizer development device 20, and the information processing server 40 according to the embodiment of the present disclosure.

Next, a hardware configuration example common to the input/output terminal 10, the recognizer development device 20, and the information processing server 40 according to the embodiment of the present disclosure will be described. FIG. 17 is a block diagram illustrating a hardware configuration example of the input/output terminal 10, the recognizer development device 20, and the information processing server 40 according to the embodiment of the present disclosure. Referring to FIG. 17, each of the input/output terminal 10, the recognizer development device 20, and the information processing server 40 has, for example, a processor 871, a ROM 872, a RAM 873, a host bus 874, a bridge 875, an external bus 876, an interface 877, an input device 878, an output device 879, a storage 880, a drive 881, a connection port 882, and a communication device 883. Note that the hardware configuration illustrated here is an example, and some of the components may be omitted. Further, components other than the components illustrated here may be further included.

(Processor 871)

The processor 871 functions as, for example, an arithmetic processing device or a control device, and controls the overall operation of each component or a part thereof on the basis of various programs recorded in the ROM 872, the RAM 873, the storage 880, or a removable recording medium 901.

(ROM 872 and RAM 873)

The ROM 872 is a unit that stores a program read by the processor 871, data used for calculation, and the like. The RAM 873 temporarily or permanently stores, for example, a program read by the processor 871, various parameters that appropriately change when the program is executed, and the like.

(Host Bus 874, Bridge 875, External Bus 876, and Interface 877)

The processor 871, the ROM 872, and the RAM 873 are mutually connected via, for example, the host bus 874 capable of high-speed data transmission. On the other hand, the host bus 874 is connected to the external bus 876 having a relatively low data transmission speed via the bridge 875, for example. Further, the external bus 876 is connected to various components via the interface 877.

(Input Device 878)

As the input device 878, for example, a mouse, a keyboard, a touch panel, a button, a switch, a lever, and the like are used. Further, as the input device 878, a remote controller capable of transmitting a control signal using infrared rays or other radio waves may be used. Further, the input device 878 includes a voice input device such as a microphone.

(Output Device 879)

The output device 879 is a device capable of visually or audibly notifying the user of acquired information, for example, a display device such as a cathode ray tube (CRT), an LCD, or an organic EL, an audio output device such as a speaker or a headphone, a printer, a mobile phone, a facsimile, or the like. Further, the output device 879 according to the present disclosure includes various vibration devices capable of outputting tactile stimulation.

(Storage 880)

The storage 880 is a device for storing various types of data. As the storage 880, for example, a magnetic storage device such as a hard disk drive (HDD), a semiconductor storage device, an optical storage device, a magneto-optical storage device, or the like is used.

(Drive 881)

The drive 881 is, for example, a device that reads information recorded on the removable recording medium 901 such as a magnetic disk, an optical disk, a magneto-optical disk, or a semiconductor memory, or writes information to the removable recording medium 901.

(Removable Recording Medium 901)

The removable recording medium 901 is, for example, a DVD medium, a Blu-ray (registered trademark) medium, an HD DVD medium, various semiconductor storage media, or the like. Of course, the removable recording medium 901 may be, for example, an IC card on which a non-contact IC chip is mounted, an electronic device, or the like.

(Connection Port 882)

The connection port 882 is a port for connecting an external connection device 902 such as a universal serial bus (USB) port, an IEEE1394 port, a small computer system interface (SCSI), an RS-232C port, or an optical audio terminal.

(External Connection Device 902)

The external connection device 902 is, for example, a printer, a portable music player, a digital camera, a digital video camera, an IC recorder, or the like.

(Communication Device 883)

The communication device 883 is a communication device for connecting to a network, and is, for example, a communication card for wired or wireless LAN, Bluetooth (registered trademark), or wireless USB (WUSB), a router for optical communication, a router for asymmetric digital subscriber line (ADSL), a modem for various communications, or the like.

4. Conclusion

As described above, the system 1 according to the present disclosure outputs information regarding an erroneous recognition target at an early stage in a development cycle of a recognizer, thereby performing information output and other processing that can prevent rework in development of the recognizer and shorten a development period.

The preferred embodiments of the present disclosure have been described in detail with reference to the accompanying drawings, but the technical scope of the present disclosure is not limited to such examples. It is obvious that a person with an ordinary skill in a technological field of the present disclosure could conceive of various alterations or corrections within the scope of the technical ideas described in the appended claims, and it should be understood that such alterations or corrections will naturally belong to the technical scope of the present disclosure.

Furthermore, the effects described in the present specification are merely illustrative or exemplary and are not restrictive. That is, the technology according to the present disclosure can exhibit other effects obvious to those skilled in the art from the description of the present specification in addition to or in place of the above effects.

Note that the following configurations also belong to the technical scope of the present disclosure.

(1)

An information processing apparatus comprising:

an output control unit that controls display of information regarding an erroneous recognition target different from a predetermined recognition target, the erroneous recognition target being specified as having a possibility of erroneous recognition on the basis of a result of recognition processing on at least one piece of specifying data by a recognizer generated for recognizing the predetermined recognition target and a result of clustering processing on a target recognized by the recognition processing, wherein the recognizer is generated by learning based on at least one piece of learning data, the at least one piece of learning data includes the predetermined recognition target and is data in substantially the same context, and the specifying data is data in substantially the same context as the context of the at least one piece of learning data.

(2)

The information processing apparatus according to (1), wherein the information regarding the erroneous recognition target is notification information for notifying the erroneous recognition target, and the output control unit controls display of the notification information.

(3)

The information processing apparatus according to (1) or (2), wherein the information regarding the erroneous recognition target is information indicating an evaluation of the recognition processing on the erroneous recognition target, and the output control unit controls display of the information indicating the evaluation.

(4)

The information processing apparatus according to any one of (1) to (3), wherein the output control unit further controls display of information indicating the context of the learning data.

(5)

The information processing apparatus according to (4), wherein the output control unit further controls display of additional information regarding the context.

(6)

The information processing apparatus according to any one of (1) to (5), wherein the information regarding the erroneous recognition target is information regarding confirmation as to whether or not the erroneous recognition target is the erroneously recognized target, and the output control unit controls display of the information regarding the confirmation.

(7)

The information processing apparatus according to any one of (1) to (6), wherein the output control unit further controls display of information regarding expansion of the learning data.

(8)
The information processing apparatus according to (7), further comprising:
an expansion support unit that controls expansion processing of the at least one piece of learning data, on the basis of a result of specifying the erroneous recognition target.

(9)
The information processing apparatus according to (8), wherein
the information regarding the erroneous recognition target is information regarding confirmation as to whether or not the erroneous recognition target is the erroneously recognized target,
the output control unit controls display of the information regarding the confirmation, and
the expansion support unit controls the expansion processing of the learning data, on the basis of feedback to the information regarding the confirmation.

(10)
The information processing apparatus according to (9), wherein
the expansion support unit performs control to expand the specifying data including the erroneous recognition target as the learning data.

(11)
The information processing apparatus according to (8), wherein
the specifying data is data acquired from a specifying data set on the basis of the context of the learning data.

(12)
The information processing apparatus according to (11), wherein
the expansion support unit controls the expansion processing of the learning data, on the basis of update of the specifying data set.

(13)
The information processing apparatus according to (12), wherein
the output control unit further controls display of information indicating update of the specifying data set, and
the expansion support unit controls the expansion processing of the learning data, on the basis of feedback to the information indicating the update.

(14)
The information processing apparatus according to (12), wherein
the output control unit further controls display of information indicating a change in recognition accuracy of the recognizer due to update of the specifying data set.

(15)
The information processing apparatus according to any one of (1) to (14), further comprising:
an erroneous recognition target specifying unit that specifies the erroneous recognition target on the basis of a result of the recognition processing on the at least one piece of specifying data by the recognizer and a result of the clustering processing on the target recognized by the recognition processing, wherein
the output control unit controls display of information regarding the erroneous recognition target specified by the erroneous recognition target specifying unit.

(16)
The information processing apparatus according to (15), further comprising:
a data classifying unit that executes the clustering processing on the target recognized by the recognition processing and classifies the recognized target into any one of a plurality of clusters, wherein
the erroneous recognition target specifying unit specifies the erroneous recognition target, on the basis of a result of the recognition processing and a result of classification of the target into the plurality of clusters by the data classifying unit.

(17)
The information processing apparatus according to (16), wherein
the erroneous recognition target specifying unit specifies a target corresponding to a cluster other than a cluster having the highest accuracy in the recognition processing, which has higher accuracy in the recognition processing than the other clusters, among the plurality of clusters, as the erroneous recognition target.

(18)
The information processing apparatus according to any one of (1) to (17), further comprising:
a context recognition unit that recognizes the context of the learning data.

(19)
An information processing method comprising:
causing a processor to controls display of information regarding an erroneous recognition target different from a predetermined recognition target, the erroneous recognition target being specified as having a possibility of erroneous recognition on the basis of a result of recognition processing on at least one piece of specifying data by a recognizer generated for recognizing the predetermined recognition target and a result of clustering processing on a target recognized by the recognition processing, wherein
the recognizer is generated by learning based on at least one piece of learning data,
the at least one piece of learning data includes the predetermined recognition target and is data in substantially the same context, and
the specifying data is data in substantially the same context as the context of the at least one piece of learning data.

(20)
A program for causing a computer to function as an information processing apparatus, wherein
the information processing apparatus includes an output control unit that controls display of information regarding an erroneous recognition target different from a predetermined recognition target, the erroneous recognition target being specified as having a possibility of erroneous recognition on the basis of a result of recognition processing on at least one piece of specifying data by a recognizer generated for recognizing the predetermined recognition target and a result of clustering processing on a target recognized by the recognition processing,
the recognizer is generated by learning based on at least one piece of learning data,
the at least one piece of learning data includes the predetermined recognition target and is data in substantially the same context, and
the specifying data is data in substantially the same context as the context of the at least one piece of learning data.

REFERENCE SIGNS LIST

1 SYSTEM
10 INPUT/OUTPUT TERMINAL
20 RECOGNIZER DEVELOPMENT DEVICE
210 DATA SET MANAGEMENT UNIT
220 RECOGNIZER DEVELOPMENT UNIT
240 COMMUNICATION UNIT
250 STORAGE UNIT
260 CONTROL UNIT
30 NETWORK
40 INFORMATION PROCESSING SERVER
410 CONTEXT RECOGNITION UNIT
420 ERRONEOUS RECOGNITION TARGET SPECIFYING UNIT
430 DATA CLASSIFYING UNIT
440 OUTPUT CONTROL UNIT
450 EXPANSION SUPPORT UNIT
460 SERVER COMMUNICATION UNIT
470 STORAGE UNIT
480 CONTROL UNIT

The invention claimed is:

1. An information processing apparatus, comprising:
an erroneous recognition target specifying unit configured to specify an erroneous recognition target as having a possibility of erroneous recognition based on a result of recognition processing on at least one piece of specifying data by a recognizer and a result of clustering processing on a target recognized by the recognition processing, wherein
the recognizer is generated to recognize a specific recognition target,
the recognizer is generated by learning based on at least one piece of learning data,
the at least one piece of learning data includes the specific recognition target and is data in substantially the same context, and
the specifying data is data in substantially the same context as the context of the at least one piece of learning data; and
control display of information regarding the erroneous recognition target specified by the erroneous recognition target specifying unit, wherein the erroneous recognition target is different from the specific recognition target.

2. The information processing apparatus according to claim 1, wherein
the information regarding the erroneous recognition target is notification information to notify the erroneous recognition target, and
an output control unit is further configured to control display of the notification information.

3. The information processing apparatus according to claim 1, wherein
the information regarding the erroneous recognition target is information indicating an evaluation of the recognition processing on the erroneous recognition target, and
the output control unit is further configured to control display of the information indicating the evaluation.

4. The information processing apparatus according to claim 1, wherein
the output control unit is further configured to control display of information indicating the context of the at least one piece of learning data.

5. The information processing apparatus according to claim 4, wherein
the output control unit is further configured to control display of additional information regarding the context of the at least one piece of learning data.

6. The information processing apparatus according to claim 1, wherein
the information regarding the erroneous recognition target is information regarding confirmation as to whether the erroneous recognition target is the erroneously recognized target, and
the output control unit is further configured to control display of the information regarding the confirmation.

7. The information processing apparatus according to claim 1, wherein
the output control unit is further configured to control display of information regarding expansion of the at least one piece of learning data.

8. The information processing apparatus according to claim 7, further comprising
an expansion support unit configured to control an expansion processing of the at least one piece of learning data, based on a result of specifying the erroneous recognition target by the erroneous recognition target specifying unit.

9. The information processing apparatus according to claim 8, wherein
the information regarding the erroneous recognition target is information regarding confirmation as to whether the erroneous recognition target is the erroneously recognized target,
the output control unit is further configured to control display of the information regarding the confirmation, and
the expansion support unit is further configured to control the expansion processing of the at least one piece of learning data, based on feedback to the information regarding the confirmation.

10. The information processing apparatus according to claim 9, wherein
the expansion support unit is further configured to perform control to expand the specifying data including the erroneous recognition target as the at least one piece of learning data.

11. The information processing apparatus according to claim 8, wherein
the specifying data is data acquired from a specifying data set based on the context of the at least one piece of learning data.

12. The information processing apparatus according to claim 11, wherein
the expansion support unit is further configured to control the expansion processing of the at least one piece of learning data, based on update of the specifying data set.

13. The information processing apparatus according to claim 12, wherein
the output control unit is further configured to control display of information indicating the update of the specifying data set, and
the expansion support unit is further configured to control the expansion processing of the at least one piece of learning data, based on feedback to the information indicating the update.

14. The information processing apparatus according to claim 12, wherein
the output control unit is further configured to control display of information indicating a change in recognition accuracy of the recognizer due to the update of the specifying data set.

15. The information processing apparatus according to claim 1, further comprising
a data classifying unit configured to execute the clustering processing on the target recognized by the recognition processing and classifies the recognized target into any one of a plurality of clusters,
wherein the erroneous recognition target specifying unit is further configured to specify the erroneous recognition target, based on the result of the recognition processing and a result of classification of the target into the plurality of clusters by the data classifying unit.

16. The information processing apparatus according to claim 15, wherein
the erroneous recognition target specifying unit is further configured to specify a target corresponding to a cluster other than a cluster having the highest accuracy in the recognition processing, which has higher accuracy in the recognition processing than the other clusters, among the plurality of clusters, as the erroneous recognition target.

17. The information processing apparatus according to claim 1, further comprising
a context recognition unit configured to recognize the context of the at least one piece of learning data.

18. An information processing method, comprising:
specifying an erroneous recognition target as having a possibility of erroneous recognition based on a result of recognition processing on at least one piece of specifying data by a recognizer and a result of clustering processing on a target recognized by the recognition processing, wherein
the recognizer is generated to recognize a specific recognition target,
the recognizer is generated by learning based on at least one piece of learning data,
the at least one piece of learning data includes the specific recognition target and is data in substantially the same context, and
the specifying data is data in substantially the same context as the context of the at least one piece of learning data; and
controlling display of information regarding the erroneous recognition target specified by the erroneous recognition target specifying unit, wherein the erroneous recognition target is different from the specific recognition target.

19. A non-transitory computer readable medium having stored thereon computer-executable instructions, which when executed by a computer, cause the computer to execute operations, the operations comprising:
specifying an erroneous recognition target as having a possibility of erroneous recognition based on a result of recognition processing on at least one piece of specifying data by a recognizer and a result of clustering processing on a target recognized by the recognition processing, wherein
the recognizer is generated to recognize a specific recognition target,
the recognizer is generated by learning based on at least one piece of learning data,
the at least one piece of learning data includes the specific recognition target and is data in substantially the same context, and
the specifying data is data in substantially the same context as the context of the at least one piece of learning data; and
controlling display of information regarding the erroneous recognition target specified by the erroneous recognition target specifying unit, wherein the erroneous recognition target is different from the specific recognition target.

* * * * *